(12) United States Patent
Bell et al.

(10) Patent No.: US 9,279,476 B2
(45) Date of Patent: Mar. 8, 2016

(54) ROPE BRAKING SYSTEM

(76) Inventors: John Bell, Westville, FL (US); William Allan von Dehl, Phoenix, AZ (US); Steven Latham, Demorest, GA (US)

( * ) Notice: Subject to any disclaimer, the term of this patent is extended or adjusted under 35 U.S.C. 154(b) by 770 days.

(21) Appl. No.: 12/758,765

(22) Filed: Apr. 12, 2010

(65) Prior Publication Data

US 2011/0108502 A1    May 12, 2011

Related U.S. Application Data

(60) Provisional application No. 61/169,172, filed on Apr. 14, 2009.

(51) Int. Cl.
| | | |
|---|---|---|
| F16G 11/04 | (2006.01) | |
| B66C 1/36 | (2006.01) | |
| B66C 13/18 | (2006.01) | |
| B66D 5/02 | (2006.01) | |
| B66D 5/30 | (2006.01) | |

(52) U.S. Cl.
CPC . *F16G 11/04* (2013.01); *B66C 1/36* (2013.01); *B66C 13/18* (2013.01); *B66D 5/02* (2013.01); *B66D 5/30* (2013.01); *F16G 11/048* (2013.01)

(58) Field of Classification Search
CPC ...... A62B 1/14; A62B 35/04; Y10T 24/3969; F16G 11/04
USPC ................... 212/278, 188; 24/136 R
See application file for complete search history.

(56) References Cited

U.S. PATENT DOCUMENTS

| | | | | |
|---|---|---|---|---|
| 3,179,994 A | * | 4/1965 | Meyer et al. | 24/134 R |
| 3,317,971 A | * | 5/1967 | Meyer | 24/134 R |
| 3,348,632 A | * | 10/1967 | Swager | 182/230 |
| 3,437,178 A | * | 4/1969 | Postlethwait | 188/65.2 |
| 3,654,672 A | * | 4/1972 | Bullar | 24/136 K |
| 3,678,450 A | * | 7/1972 | Azamber et al. | 439/726 |
| 4,027,748 A | * | 6/1977 | Persson | 188/65.4 |
| 4,253,218 A | * | 3/1981 | Gibbs | 24/134 R |
| 4,264,056 A | * | 4/1981 | Singer | 254/391 |
| 4,339,853 A | * | 7/1982 | Lipschitz | 70/57.1 |
| 4,569,507 A | * | 2/1986 | Robert | 254/246 |
| 4,588,045 A | * | 5/1986 | Walker, Sr. | 182/5 |
| 5,015,023 A | * | 5/1991 | Hall | 294/102.1 |
| 5,083,469 A | * | 1/1992 | Percheron et al. | 73/862.42 |
| 5,156,240 A | * | 10/1992 | Ostrobrod | 188/65.1 |
| 5,201,821 A | * | 4/1993 | Ericson et al. | 254/375 |
| 5,226,508 A | * | 7/1993 | Ericson et al. | 187/254 |

(Continued)

*Primary Examiner* — Emmanuel M Marcelo
*Assistant Examiner* — Michael Gallion
(74) *Attorney, Agent, or Firm* — Keith L. Jenkins, Registered Patent Attorney, LLC; Keith L. Jenkins

(57) ABSTRACT

A compression chuck for variously conducting and braking a rope, wherein the compression chuck includes a first and second portions. The invention includes a first biasing mechanism which maintains the compression chuck first and second portions in a disengaged condition with the rope, wherein the rope is conducted freely in response to outside forces on the rope. Also included is an actuator, wherein the actuator is operable to overbear the first biasing mechanism to place the compression chuck in an engaged condition with the rope in response to a rope break, braking movement of the rope. The first and second compression chuck portions may be carried on opposing parallel plates that are biased apart until the actuator moves such plates together in response to a rope break. At least one of the plates may be fixed to a crane head, crane, or other structure proximate a moving rope, when installed.

17 Claims, 23 Drawing Sheets

(56) References Cited

U.S. PATENT DOCUMENTS

| | | | | |
|---|---|---|---|---|
| 5,369,849 | A * | 12/1994 | De France | 24/136 R |
| 5,392,496 | A * | 2/1995 | Johnson | 24/136 R |
| 5,638,919 | A * | 6/1997 | Pejout | 182/192 |
| 5,924,522 | A * | 7/1999 | Ostrobrod | 182/191 |
| 5,927,438 | A * | 7/1999 | Ostrobrod | 182/241 |
| 6,378,650 | B2 * | 4/2002 | Mauthner | 182/5 |
| 6,488,267 | B1 * | 12/2002 | Goldberg et al. | 254/264 |
| 6,530,454 | B1 * | 3/2003 | Renton et al. | 182/36 |
| 6,557,670 | B2 * | 5/2003 | Wang | 187/290 |
| 6,607,058 | B2 * | 8/2003 | Angerbauer et al. | 188/65.1 |
| 7,267,201 | B2 * | 9/2007 | Ito | 187/372 |
| 7,658,264 | B2 * | 2/2010 | Mauthner | 182/5 |
| 7,753,176 | B2 * | 7/2010 | Kigawa et al. | 187/286 |
| 2002/0117357 | A1 * | 8/2002 | Hugel | 187/376 |
| 2005/0173206 | A1 * | 8/2005 | Reuter et al. | 188/72.7 |
| 2006/0118367 | A1 * | 6/2006 | Arakawa et al. | 188/72.1 |
| 2007/0051563 | A1 * | 3/2007 | Oh et al. | 187/371 |
| 2007/0181378 | A1 * | 8/2007 | Kigawa et al. | 187/376 |
| 2008/0230325 | A1 * | 9/2008 | Chida | 187/393 |
| 2010/0288587 | A1 * | 11/2010 | Doran | 187/350 |

* cited by examiner

ROPE BRAKING SYSTEM

CROSS REFERENCE TO RELATED APPLICATION

This application claims priority to U.S. Provisional Patent Application entitled "Wire Rope Braking Systems", Ser. No. 61/169,172, filed Apr. 14, 2009 for the same inventor, the disclosures of which are hereby incorporated entirely herein by reference.

BACKGROUND OF THE INVENTION

1. Technical Field

This invention relates to rope braking systems, more specifically to systems which brake the movement of a rope being used to lift or haul a load.

2. State of the Art

A rope braking system is used to brake the movement of a rope that has broken while being used to support or lift a weight. Braking the movement of a rope means stopping its movement, or halting payout of a rope so that any load carried by the rope does not fall. Ropes such as wire ropes can be used with a pulley. A rope and a pulley can be used to lift or haul a weight. A sheave is the wheel of a pulley having a grooved rim for holding the rope. A crane block includes a pulley and a hook for attaching a load. Modern cranes use crane blocks having multiple sheaves. The multiple sheaves allow the load to be spread over multiple loops of rope, allowing loads to be lifted that are heavier than a single strand of wire rope could lift. "Cable" is an archaic word for wire rope, which has been disfavored since communications cables have become well known.

U.S. Pat. No. 6,378,650 discloses a rope brake with a pivotable pulley that can be rotated to first or second sides against first or second side fixed wedges to compress the rope and thereby brake the rope. The braking can be released by rotating the pulley to the center.

U.S. Pat. No. 5,924,522 discloses a cable grab that uses a levered cam for a personal safety device application. U.S. Pat. No. 5,156,240 discloses a rope grab that also uses a levered cam for a personal safety device application.

U.S. Pat. No. 4,264,056 discloses a pulley with a rotatable sheave and a non-rotating sheave, where engaging the rope on the non-rotating sheave provides braking action.

U.S. Pat. No. 4,027,748 discloses a braking device for ropes that uses multiple bends of rope around pins for braking action.

U.S. Pat. No. 4,569,507 discloses a traction block for a linear winch that operates on a single strand of rope and seizes the rope by compressing halves of a clamping block in a tapered channel formed by flanges with rollers between the clamping block and the flanges.

Occasionally, a rope will break while in use, causing the load to descend out of control and leading to damage to the load, whatever the load lands on, and possibly death or serious injury to humans. When the rope is part of a crane system, the crane operator may react quickly enough to mitigate the damage, but a broken wire rope on a crane under load usually causes catastrophic damage, despite best effort.

There is, therefore a need for a method and apparatus for making safe a load, a crane head, a crane, and nearby personnel in response to a broken rope and to accomplish this with great speed.

OBJECTS AND FEATURES OF THE INVENTION

A primary object and feature of the present invention is to overcome the above-mentioned problems and fulfill the above-mentioned needs.

Another object and feature of the present invention is to provide a rope braking system attachable to a crane head that can prevent continued movement of the rope after the rope breaks. It is a further object and feature of the present invention to provide a wire rope breaking system that preserves as many strands of rope as may be possible for supporting the load after the rope breaks. It is a further object and feature of the present invention to provide a rope braking system that operates automatically. It is a further object and feature of the present invention to provide a rope braking system that can sense when a rope has broken. It is a further object and feature of the present invention to provide a rope braking system that can be integrated on a crane head. It is a further object and feature of the present invention to provide a rope braking system that can be integrated on a crane. It is a further object and feature of the present invention to provide a rope braking system that can be remotely or automatically electronically controlled.

It is an additional primary object and feature of the present invention to provide such a system that is efficient, inexpensive and handy. Other objects and features of this invention will become apparent with reference to the following descriptions.

SUMMARY OF THE INVENTION

The present invention relates to rope braking systems used to halt the movement of a rope that has broken while being used to haul or lift a load.

Disclosed is a rope braking system including a first plate; a second plate parallel to and spaced apart from the first plate; a first portion of a compression chuck coupled to the first plate; a biasing mechanism able to maintain the second plate spaced-apart from the first plate in a first configuration; and an actuator coupled to at least the second plate and able to overbear the biasing mechanism to urge the second plate towards the first plate in a second configuration. The rope braking system, including a second portion of the compression chuck coupled to the second plate and aligned to the first portion of the compression chuck. The rope braking system, where the first portion of a compression chuck and the second portion of a compression chuck includes a tapered bore surrounding a first opening in either the first plate or the second plate; or at least first and second resilient wedge members opposed across a second opening in either the second plate or the first plate, respectively. The rope braking system, where the second portion of the compression chuck includes a base portion having the tapered bore. The rope braking system, including first and second side plates able to couple the first plate to a crane head; couple the first plate to a crane; couple said first plate to a structure; and/or constrain movement of the second plate. The rope braking system, including a rope-break sensor, able to detect a break in such rope and signal a controller concurrent with said rope break detection. The rope braking system, including a controller able to receive a signal from a rope-break sensor indicating that such rope has broken and respond to the received signal by energizing the actuator. The rope braking system, including a crane head, where the crane head is able to be fixed to either the first plate and the second plate. The rope braking system, including a crane coupled to either a crane head coupled to the first plate or to the first plate. The rope braking system, including a semi-cavity along an edge of the first plate and/or the second plate and an edge member including a semi-cavity complementary to, and alignable to, the semi-cavity along the edge of either the first plate or the second plate, where the edge member is able to be fastened to the edge of either the first plate or the second plate to form complimentary and alignable semi-cavities into a opening able to conduct a rope. The rope braking system, where the edge member is able to be fastened by a screw and/or a dovetail joint. The rope braking system, where the actuator includes an electromagnet. The rope braking system, including a support plate able to be coupled to at least the first plate, and further able to support a rope-break sensor and/or a controller.

A rope braking system including a first plate; a second plate parallel to and spaced apart from the first plate; a first portion of a compression chuck coupled to the first plate; a biasing mechanism able to maintain the second plate spaced-apart from the first plate in a first configuration; an electromagnetic actuator coupled to at least the second plate and able to overbear the biasing mechanism to urge the second plate towards the first plate in a second configuration; and a second portion of the compression chuck coupled to the second plate and aligned to the first portion of the compression chuck coupled to the first plate. The rope braking system, where the first portion of a compression chuck and the second portion of a compression chuck includes one of a tapered bore surrounding a first opening in one of the first plate and the second plate; and at least first and second resilient wedge members opposed across a second opening in either the second plate or the first plate, respectively; and where the tapered bore includes either a base portion of the compression chuck having the tapered bore or the tapered bore in either the first plate or the second plate. The rope braking system, including first and second side plates able to couple the first plate to a crane head; couple the first plate to a crane; and/or couple the first plate to a structure; a rope-break sensor, able to detect a break in such rope and able to signal a controller concurrent with such rope break detection where the controller is able to receive a signal from the rope-break sensor indicating that such rope has broken and respond to the received signal by energizing the electromagnetic actuator. The rope braking system, including a crane head, where the crane head is able to be fixed to the first plate and/or the second plate and to be coupled to a crane. The rope braking system, including a support plate, able to be coupled to at least the first plate, and further able to support a rope-break sensor and/or a controller. The rope braking system, including a semi-cavity along an edge of the first plate and/or the second plate; and an edge member including a semi-cavity complementary to, and alignable to, the semi-cavity along the edge of the first plate and the second plate, where the edge member is able to be fastened to the edge of one of the first plate and/or the second plate to form the complimentary and alignable semi-cavities into a opening able to conduct the rope and where the edge member is able to be fastened by a screw and/or a dovetail joint.

A rope braking system including a first plate; a second plate parallel to and spaced apart from the first plate; a first portion of a compression chuck coupled to the first plate; a biasing mechanism able to maintain the second plate spaced-apart from the first plate in a first configuration; an electromagnetic actuator coupled to at least the second plate and able to overbear the biasing mechanism to urge the second plate towards the first plate in a second configuration; and a second portion of the compression chuck coupled to the second plate and aligned to the first portion of the compression chuck coupled to the first plate; where the first portion of a compression chuck and the second portion of a compression chuck includes one of a tapered bore surrounding a first opening in one of the first plate and the second plate or at least first and second resilient wedge members opposed across a second opening in the second plate and/or the first plate, respectively; and where the tapered bore includes either a base portion having the tapered bore or a tapered bore in the first plate and/or the second plate; first and second side plates able to couple the first plate to a crane head; couple the first plate to a crane; and/or couple the first plate to a structure; a rope-break sensor, able to detect a break in such rope; and signal a controller concurrent with such rope break detection, where the controller is able to receive a signal from the rope-break sensor indicating that such rope has broken; and respond to the received signal by energizing the electromagnetic actuator; a crane head, where the crane head is able to be fixed to either the first plate or the second plate; and be coupled to a crane; a support plate, able to be coupled to at least the first plate, and further able to support the rope-break sensor and the controller; a semi-cavity along an edge of the first plate and/or the second plate; and an edge member including a semi-cavity complementary to, and alignable to, the semi-cavity along the edge of the first plate and/or the second plate, where the edge member is able to be fastened to the edge of the first plate and/or the second plate to form the complimentary and alignable semi-cavities into an opening able to conduct such rope; and where the edge member is able to be fastened by a screw and/or a dovetail joint.

A rope-braking system for variously conducting and braking the payout of a rope, including a compression chuck, including first and second compression chuck portions, able to conduct such rope or brake such rope; a biasing mechanism able to bias the first compression chuck portion in a spaced-apart disengaged relationship with the second compression chuck portion, the disengaged relationship being able to conduct a rope; an actuator mechanism, coupled to the first compression chuck portion and/or the second compression chuck portion, able, responsive to an indication that such rope has broken, to overbear the biasing mechanism to urge the first and second compression chuck portions to an engaged relationship, the engaged relationship being able to brake a rope.

The foregoing and other features and advantages of the present invention will be apparent from the following more detailed description of the particular embodiments of the invention, as illustrated in the accompanying drawings.

BRIEF DESCRIPTION OF THE DRAWINGS

The above and other objects and advantages of the present invention will become more apparent from the following description taken in conjunction with the following drawings in which.

DETAILED DESCRIPTION OF THE INVENTION

As discussed above, embodiments of the present invention relate to a rope braking system. The breakage of a rope on a load line in a winch or crane system can mean catastrophic equipment damage as well as injury or death to humans. A rope braking system according to the invention terminates the payout of the rope in the event of a rope break or separation. As used and defined herein, a "rope" is any filament or assembly of wound filaments of any material whatsoever. The examples below are directed to wire rope used with cranes to lift loads, but the invention is not so limited. As used and defined herein, a "compression chuck" is a device for seizing a rope, which includes the combination of a tube or opening through which a rope may be conducted, and one or more wedges that can be intruded between the tube or opening and the rope to compress the rope and bring the rope to a halt, relative to the tube or opening. The words "top", "bottom", "upper" and "lower" especially as used to describe plates of the invention, are referenced to the drawings, and are not a use limitation: the invention can be used in any orientation.

Figure 1A:
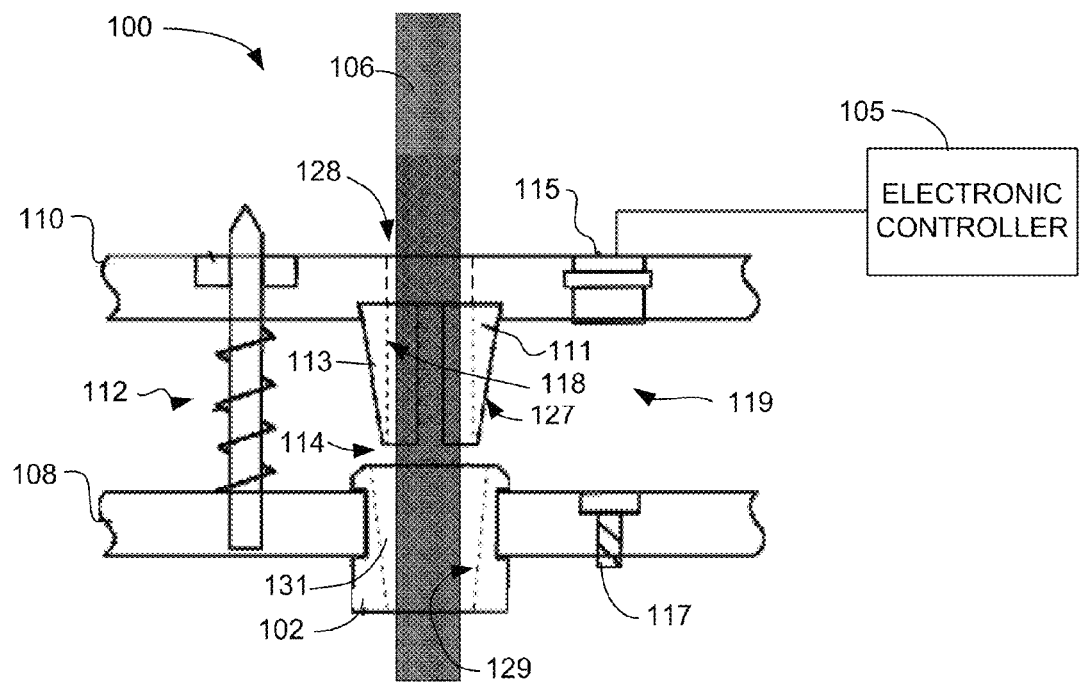
FIG. 1A is a side cross-sectional view illustrating an exemplary rope braking system, in accordance with a preferred embodiment of the present invention.
Figure 2A:
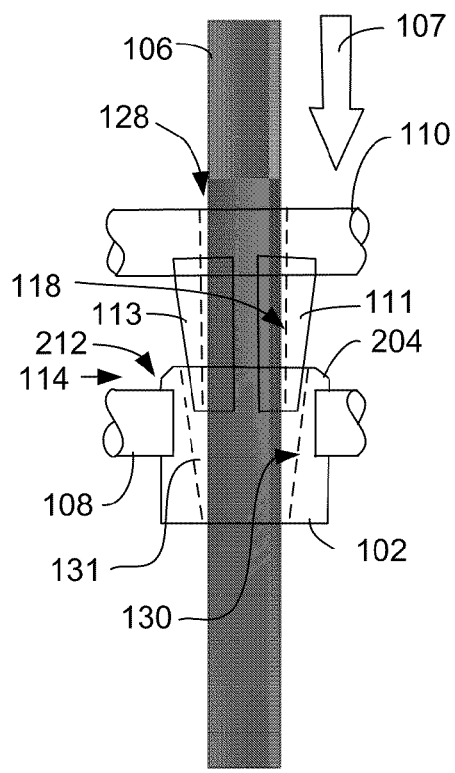
FIG. 2A is a side elevation cross-sectional view illustrating an exemplary compression chuck used with the exemplary rope braking system of FIG. 1A, in accordance with a preferred embodiment of the present invention.
Figure 2B:
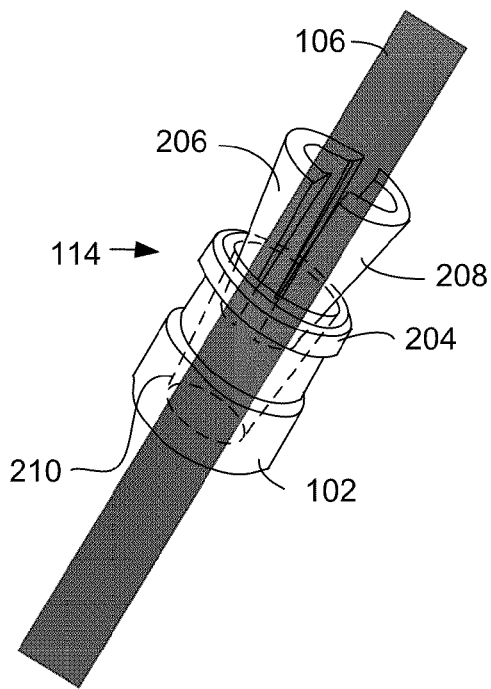
FIG. 2B is a perspective view illustrating an exemplary disengaged (open) compression chuck of FIG. 2A, in accordance with a preferred embodiment of the present invention.

FIG. 1A is a side cross-sectional view of a rope braking system 100 according to the invention including rope 106, compression chuck 114, top plate 110, bottom plate 108, biasing mechanism 112 and electromagnetic actuator system 119. Top plate 110 is supported in a spaced apart relationship above bottom plate 108 by biasing mechanism 112, illustrated as a spring. Compression chuck 114 includes compression chuck base 102 and compression chuck resilient wedge members 111 and 113. Compression chuck base 102 is a tube with a tapered bore 131 through which rope 106 is conducted. Compression chuck 114 is held in a disengaged condition by biasing mechanism 112 maintaining a space between top plate 110 and bottom plate 108. Biasing mechanism 112 prevents, in the normal operational configuration, resilient wedge members 111 and 113 from intruding into the tapered bore 131. Resilient wedge members 111 and 113 are exemplary means for constricting the tapered bore 131 to prevent conduct of the rope 106. Compression chuck 114 is held in a disengaged condition with rope 106 by top plate 110 and bottom plate 108. Compression chuck 114 remains in a disengaged condition with rope 106 during normal operation of rope 106, allowing unimpeded movement and operation of the rope 106 though opening 128, between resilient wedge members 111 and 113, and through base 102. Normal operation of rope 106 is when there is no rope breakage or other reason to halt the movement of rope 106. Compression chuck 114 in a disengaged condition with rope 106 is also shown in FIG. 2A and FIG. 2B, to be discussed below. When placed in an engaged condition with rope 106, compression chuck 114 will secure rope 106, braking its movement. Compression chuck 114 is typically placed in an engaged condition with rope 106 when there is a rope breakage, or when there is a need to quickly halt or brake the movement of rope 106. Compression chuck 114 is shown in an engaged condition with rope 106 in FIG. 2C, to be discussed below.

Electromagnetic actuator system 119 includes electromagnet 115 and anchor 117. Electromagnetic actuator system 119 in rope braking system 100 moves the compression chuck 114 from a disengaged condition with rope 106 to an engaged condition with rope 106. Activation of electromagnetic actuator system 119 urges upper plate 110 toward lower plate 108 and thereby places compression chuck 114 into an engaged condition relative to rope 106, as upper plate 110 carries resilient wedge members 111 and 113 into the tapered bore 131 to compress rope 106 as the inner surface 129 of tapered bore 131 compels the resilient wedge members 111 and 113 to compress the rope 106. Electromagnetic actuator system 119 is connected to electronic controller 105, which places electromagnet 115 in an energized or a non-energized state. Controller 105 is used to activate electromagnetic actuator system 119. Electromagnet 115 is placed in an energized state in response to activation of electromagnetic actuator system 119. When electromagnetic actuator system 119 is activated, upper plate 110 is urged toward lower plate 108, causing the outer surface 127 of resilient wedge members 111 and 113 to engage the inner surface 129 of tapered bore 131 of the base 102. As the resilient wedge members 111 and 113 engage the base 102, resilient wedge members 111 and 113 are forced together by the tapered bore 131 and so compress rope 106.

When electromagnet 115 is in a non-energized state, which occurs during normal non-emergency use of rope 106, electromagnet 115 is inactive, allowing biasing mechanism 112 to maintain a spaced relationship between plates 108 and 110, and compression chuck 114 to remain in a disengaged condition with rope 106. Compression chuck 114 remains in a disengaged condition with rope 106 in response to electromagnet 115 being in a non-energized state.

Electromagnetic actuator system 119, when energized with electronic controller 105, creates a strong magnetic attractive force between electromagnet 115 and anchor 117. Anchor 117 is made of a magnetic material. Electromagnet 115 is secured to top plate 110 and anchor 117 is secured to bottom plate 108. When electromagnet 115 is energized, electromagnetic actuator system 119 overbears the biasing force of biasing mechanism 112 to urge top plate 110 toward abutment with bottom plate 108. This engages compression chuck 114 with rope 106, braking the movement of rope 106 by frictional and compressive forces between the rope 106 and the interior surface 118 of resilient wedge members 111 and 113 of compression chuck 114. In this way controller 105 places compression chuck 114 in an engaged condition in response to activation of electromagnetic actuator system 119. Compression chuck 114 is shown in an engaged condition with rope 106 in FIG. 2C, to be discussed below. Compression chuck 114 is placed in an engaged condition with rope 106, braking the movement of rope 106, in response to electromagnet 115 being in an energized state.

Electromagnetic actuator system 119 is exemplary and not a limitation. For example, a magnetic actuator system 119 that uses variation in orientation of pairs of magnets, a first magnet of which can be rotated into polar alignment with a second, may also be used in an alternate embodiment.

Electronic controller 105 can take many forms. Electronic controller 105 can include a source of power to energize electromagnet 115, and a switch which can be in an open state when there is no rope breakage, and in a closed state when there is a rope break, energizing electromagnet 115 and placing compression chuck 114 in an engaged state with rope 106, braking the movement of the rope 106. A rope break sensor can be used to actuate the switch. Electronic controller 105 is discussed in further detail in relation to FIG. 8.

Figure 1B:
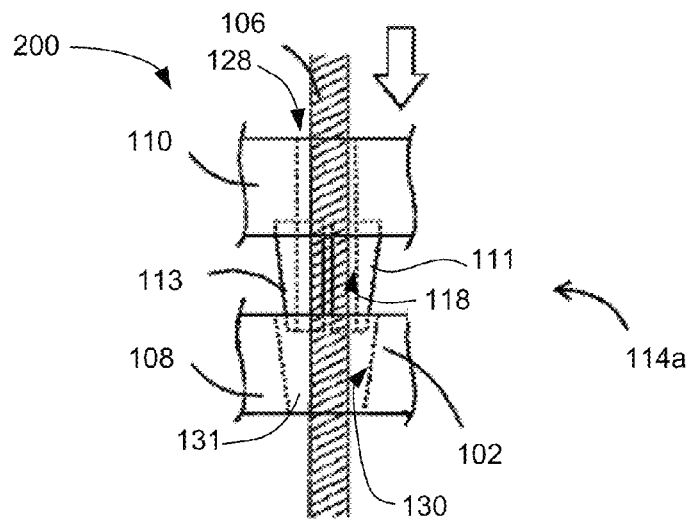
FIG. 1B is a cross-sectional side view illustrating an exemplary compression chuck of the exemplary rope braking system, in accordance with a preferred embodiment of the present invention.

FIG. 1B is a cross-sectional side view illustrating an exemplary compression chuck 114a of the exemplary rope braking system 100, in accordance with a preferred embodiment of the present invention. Compression chuck 114 can take many different forms. Compression chuck 114a differs from compression chuck 114 of FIG. 1A in that compression chuck base 102 and bottom plate 108 are a single integral piece. Compression chuck 114a is used in applications of rope braking system 100 where bottom plate 108 has a thickness large enough to integrate compression chuck base 102. Compression chuck base 114a is shown used in crane head 302 according to the invention in FIG. 9A. Tapered cavity 130 receives and compresses resilient wedge members 111 and 113 as upper plate 110 is urged toward lower plate 108. Compressed resilient wedge members 111 and 113 compress rope 106, creating a braking action.

FIG. 2A is a side elevation cross-sectional view illustrating compression chuck 114 used with wire rope braking system 100 of FIG. 1A, in accordance with a preferred embodiment of the present invention. The arrow shows the direction of movement 107 of wire rope 106 after rope breakage 940 (see FIG. 9A) occurs, which is the lowering or payout direction. Compression chuck base 102 is held by bottom plate 108 in opening 212. Shoulder 204 secures base 102 in opening 212. Compression chuck resilient wedge members 111 and 113 are supported by top plate 110. Resilient wedge members 111 and 113 are tapered in cross-section so that the entire cylindrical interior surface 118 may frictionally engage wire rope 106 evenly. Compression chuck resilient wedge members 111 and 113 are also referred to in this document as wedge members or wedges. In some embodiments, interior surface 118 of resilient wedge member 111 and 113 may be ridged 1602 (see FIG. 16 to FIG. 20) to grab rope 106 securely during engagement. FIG. 2A shows compression chuck 114 in a disengaged condition with rope 106.

FIG. 2B is a perspective view illustrating an exemplary compression chuck 114 in a disengaged (open) condition with exemplary rope 106, as used with the exemplary wire rope braking system 100 of FIG. 1A, in accordance with a preferred embodiment of the present invention. Resilient wedge members 111 and 113 are shown as separate members in the drawings. In some embodiments resilient wedge members 111 and 113 are formed as a single piece. In other embodiments resilient wedge members 111 and 113 are formed as more than two pieces. Resilient wedge members 111 and 113 as shown in the embodiment illustrated in FIG. 2B are tapered semi-annuluses with interior surfaces 118 that form a right circular cylindrical cavity when brought together. Compression chuck base 102 encircles rope 106. Compression chuck base 102 and resilient wedge members 111 and 113 are held in a spaced-apart relationship by bottom plate 108 and top plate 110 in rope braking system 100, as shown in FIG. 1A and FIG. 2A. When compression chuck resilient wedge members 111 and 113 are held in a spaced-apart relationship to compression chuck base 102 as shown in FIG. 1A, FIG. 2A and FIG. 2B, rope 106 is conducted freely through compression chuck 114. When compression chuck resilient wedge members 111 and 113 are held in a spaced-apart relationship to compression chuck base 102 as shown in FIG. 1A, FIG. 2A, and FIG. 2B, compression chuck 114 is said to be in the disengaged condition with rope 106. Rope 106 is conducted freely through compression chuck 114 in response to compression chuck 114 being in the disengaged condition with rope 106.

Figure 2C:
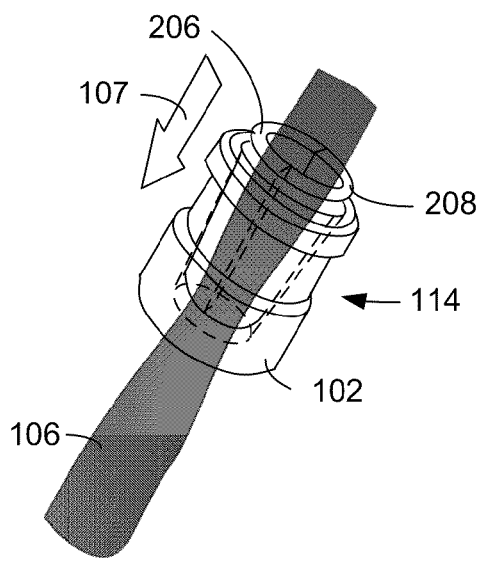
FIG. 2C is a perspective view illustrating the exemplary compression chuck of FIG. 2A engaged with an exemplary rope, in accordance with a preferred embodiment of the present invention.

FIG. 2C is a perspective view illustrating the exemplary compression chuck 114 in an engaged (closed) condition with exemplary rope 106, as used with the exemplary wire rope braking system 100 of FIG. 1A, in accordance with a preferred embodiment of the present invention. The arrow shows direction of movement 107 of wire rope 106 in the broken (lowering, unloading, or payout) condition. Resilient wedge members 111 and 113 have been urged into tapered cavity 131 of base 102, causing them to frictionally and compressively engage rope wire 106. Once resilient wedge members 111 and 113 are frictionally engaged with rope 106, rope 106 moving in direction 107 forces resilient wedge members 111 and 113 further into base 102, increasing the compressive force on rope 106 and the resulting braking force on rope 106. In rope braking system 100 shown in FIG. 1A, electromagnetic actuator system 119, when energized, urges top plate 110 towards bottom plate 108, urging resilient wedge members 111 and 113 into base member 102, compressing resilient members 111 and 113 around rope 106, thereby braking the movement of rope 106. Once resilient members 111 and 113 are frictionally engaged to rope 106, both the electromagnetic forces and friction forces serve to engage compression chuck 114 with rope 106. When compression chuck resilient wedge members 111 and 113 are inserted into compression chuck base 102 as shown in FIG. 2C, rope 106 is braked and restricted from movement such as passing through compression chuck 114. When compression chuck resilient wedge members 111 and 113 are inserted into compression chuck base 102 as shown in FIG. 2C, compression chuck 114 is said to be in an engaged condition with rope 106. Rope 106 is restricted from passing through compression chuck 114 in response to compression chuck 114 being in an engaged condition with rope 106. Rope 106 is braked from movement in response to compression chuck 114 being in an engaged condition with rope 106.

Figure 2D:
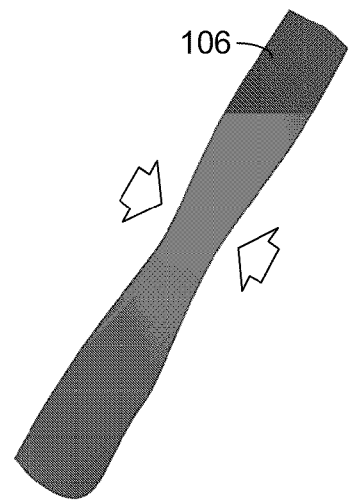
FIG. 2D is a perspective view illustrating an exemplary braking effect on an exemplary wire rope of the exemplary rope braking system of FIG. 1A, in accordance with a preferred embodiment of the present invention.

FIG. 2D is a perspective view illustrating an exemplary braking effect of compression chuck 114 on the exemplary wire rope 106, in accordance with a preferred embodiment of the present invention. Wire rope 106 is compressed during engagement with compression chuck 114, and is held tight, in a completely braked configuration.

Figure 3:
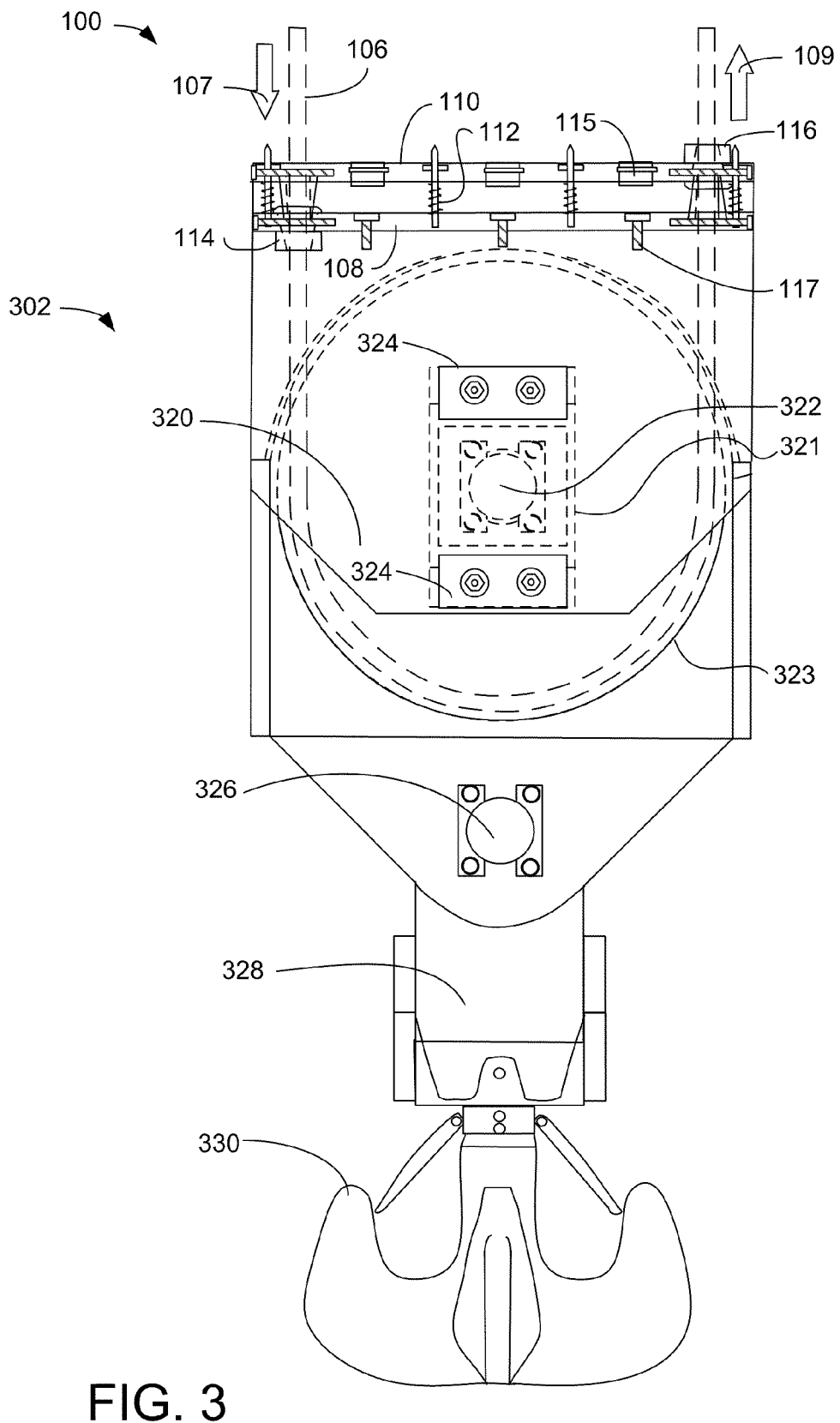
FIG. 3 is a side elevation view illustrating an exemplary rope braking system of FIG. 1A on an exemplary crane head, in accordance with a preferred embodiment of the present invention.

FIG. 3 is a side elevation view illustrating an exemplary crane head 302 with the exemplary rope braking system 100, in accordance with a preferred embodiment of the present invention. Crane head 302 includes hook 330, swivel 328, pivot 326, pulley 323 rotating on axle 322, and interconnecting structural members 321. Side plate 320 is a part of the rope braking system 100 and, when installed, is attached to the axle 322 of pulley 323 with couplings 324. Side plates 320 (one on each side of crane head 320) support bottom plate 108. Bottom plate 108 is attached to extensions 334 of side plate 320 with screws 332. Top plate 110 is supported in a spaced-apart relationship above bottom plate 108 by biasing mechanisms 112, illustrated as springs around axles. Top plate 110 has one or more electromagnetic actuator systems 119 which, when energized, overcome the biasing force of biasing mechanisms 112 to urge top plate 110 toward abutment with bottom plate 108.

Electromagnetic actuator systems 119 include electromagnets 115 operable to be energized by controller 105 and anchors 117, which are attractive to magnets. In an alternate embodiment, plates 108 and 110 may incorporate magnetic materials in a composite material, rather than using anchors 117.

Bottom plate 108 supports base 102 (see FIG. 2A) of down-rope compression chuck 114, through which rope 106 passes on its way to the sheaves of pulley 323. In this exemplary embodiment rope 106 is a wire rope 106. In other embodiments, rope 106 can be other types of rope 106. Directional arrow 107 of FIG. 3 indicates the direction of travel expected when rope 106 breaks 940 (the falling or lowering direction). Top plate 110 supports resilient wedge members 111 and 113, which are part of compression chuck 114. As top plate 110 is urged toward abutment with bottom plate 108, tapered cavity 131 in base 102 urges resilient members 111 and 113 together, causing compression chuck 114 to frictionally engage and compress wire rope 106, creating a braking action on wire rope 106. Wire rope 106, thus frictionally and compressively engaged, exerts a force on resilient wedge members 111 and 113, urging them further into base 102, further increasing compression on the rope 106 and creating further friction and consequently braking the movement of wire rope 106 completely. Thus, after initially energizing electromagnetic actuator system 119, the rope braking system 100 sustains itself in the braked configuration.

Top plate 110 supports base 102 (see FIG. 2A) of up-rope compression chuck 116 through which wire rope 106 passes on its way away from the sheaves of pulley 323. Up-rope compression chuck 116 is similar to down-rope compression chuck 114, but with a 180° difference in orientation. Directional arrow 109 of FIG. 3 indicates the direction of travel expected when rope 106 breaks 940 (the falling or lowering direction). Fixed bottom plate 108 supports resilient wedge members 111 and 113, which are part of compression chuck 116. As top plate 110 is urged toward abutment with bottom plate 108, tapered cavity 131 in base 102 urges resilient wedge members 111 and 113 together, causing compression chuck 116 to frictionally engage and compress wire rope 106, creating a braking action on wire rope 106. With the wire rope 106 braked at both sides of pulley 323, only the broken or severed strand fails to support the load, thereby maximizing the emergency lift available. Thus the load is secured in response to the braking of the movement of rope 106 by compression chucks 114 and 116.

Figure 9A:
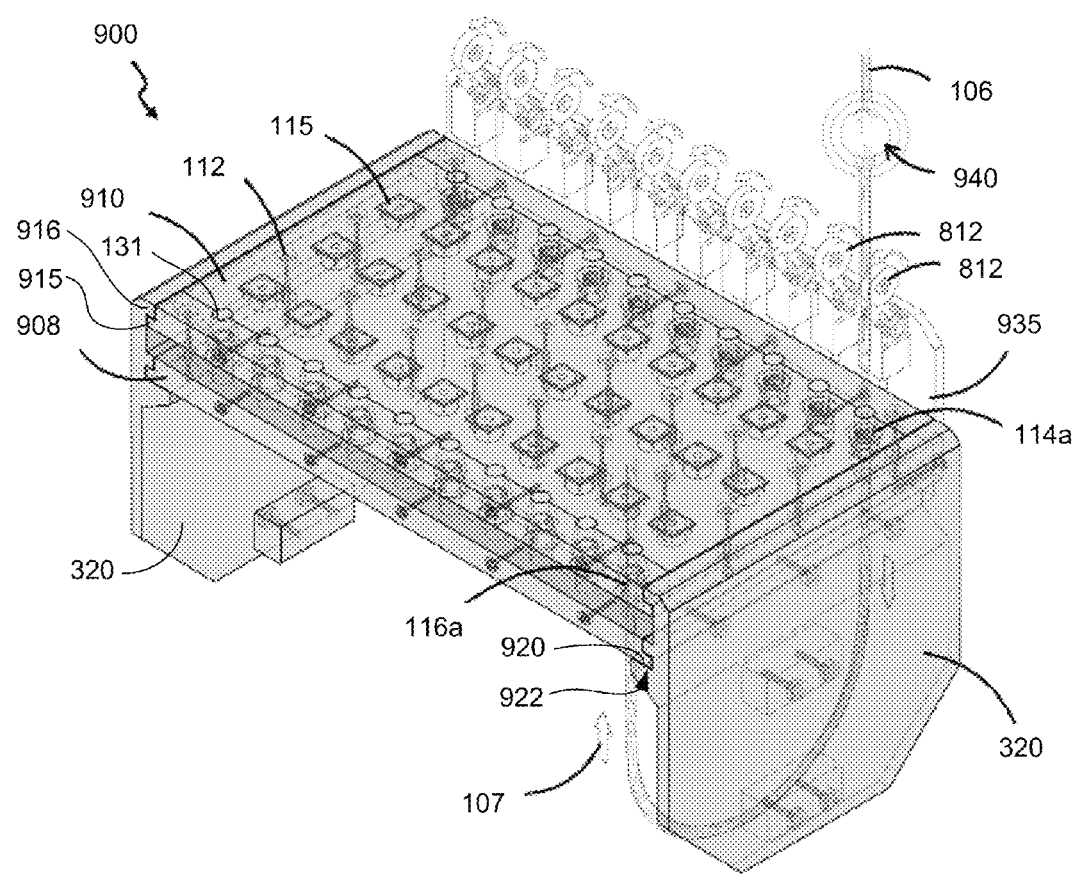
FIG. 9A is a top-front perspective view illustrating an additional embodiment of the exemplary rope braking system, in accordance with a preferred embodiment of the present invention.

In an alternate embodiment, compression chuck base 102 is formed as an integral part of either bottom plate 108 or top plate 110. This embodiment is shown in FIG. 1B and FIG. 9A.

Figure 4:
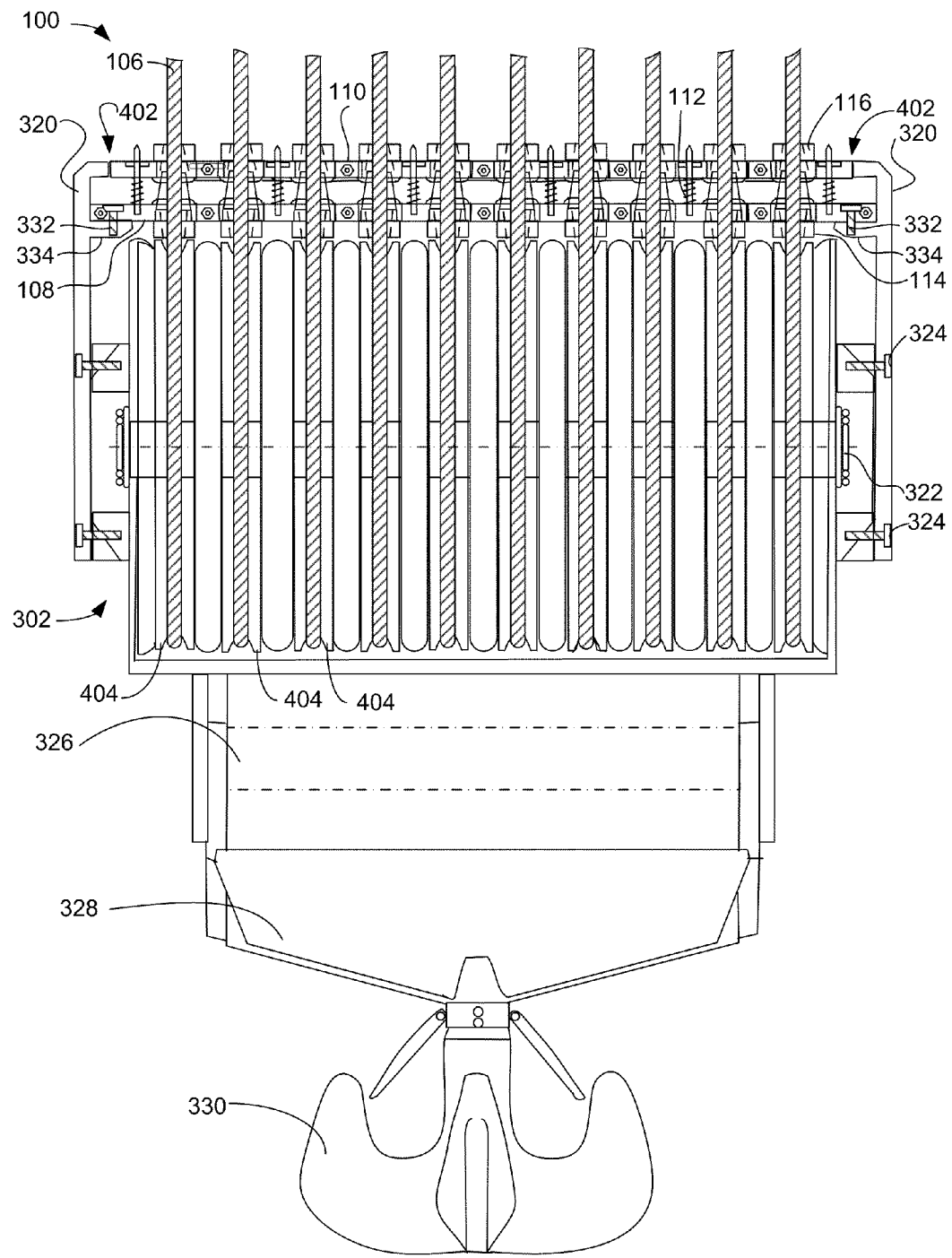
FIG. 4 is a front elevation view illustrating the exemplary crane head of FIG. 3 using exemplary rope braking system of FIG. 1A, in accordance with a preferred embodiment of the present invention.

FIG. 4 is a front elevation view illustrating the exemplary crane head 302 with the exemplary wire rope braking system 100 of FIG. 3 on crane head 302, in accordance with a preferred embodiment of the present invention. Sheaves 404 (three of ten labeled) rotationally engage wire rope 106. It is understood by those of skill in the art that there is only one rope 106 and it passes between the sheaves 404 and a similar arrangement of sheaves attached to the crane 2100 (see FIG. 21) structure. As the one wire rope 106 is wound by a crane 2100, for example, the force required to lift the load is spread among ten loops of wire rope 106. Bottom plate 108 is fixed to side plate 320 which, in turn, is fixed to the non-rotating structure of pulley 323 with couplings 324. Top plate 110 is free to move up or down: joints 402 permit vertical sliding. By supporting resilient wedge members 111 and 113 of compression chuck 116 on bottom plate 108, torqueing of top plate 110 due to the frictional force of the upwardly bound strands of wire rope 106 is avoided. Note that the frictional forces of the upwardly moving strands do not further urge resilient members 111 and 113 into base 102 of compression chuck 116, as bottom plate 108 does not move. In an alternate embodiment, a split plate 108, 110 system may be used, in which the first plate to be engaged by the rope 106 is always a moveable plate, and the second plate to be engaged is always a fixed plate. In that alternate embodiment, the friction force of the wire rope 106 would always increase the braking action, whether it is the in-bound or out-bound strand.

Figure 5:
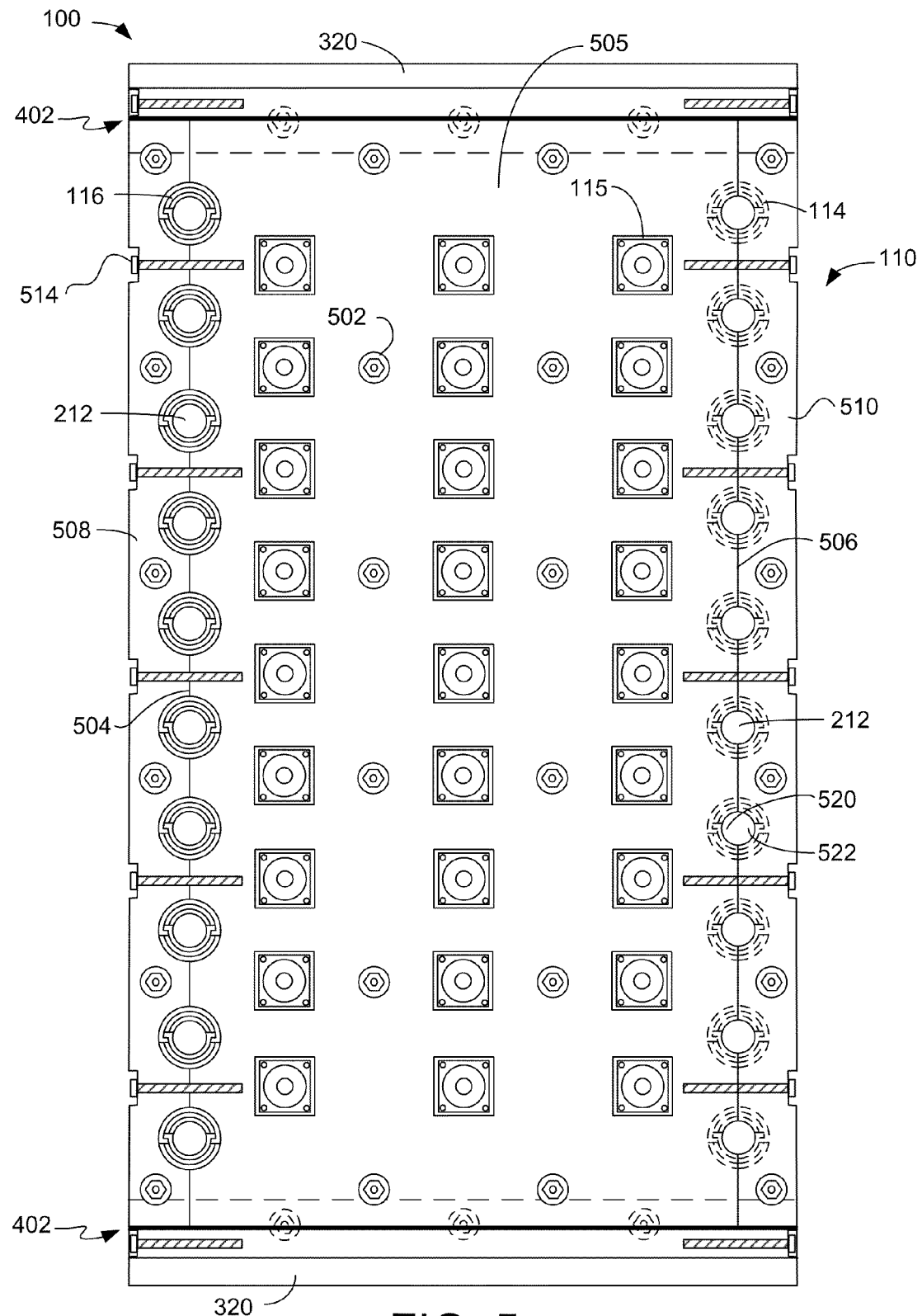
FIG. 5 is a top plan view illustrating the exemplary rope braking system of the exemplary crane head of FIG. 3, in accordance with a preferred embodiment of the present invention.

FIG. 5 is a top plan view illustrating the exemplary wire rope braking system 100 of FIG. 3, in accordance with a preferred embodiment of the present invention. Top plate 110 has a plurality of up-rope compression chucks 116 (one of ten labeled), down-rope compression chucks 114 (one of ten labeled), electromagnets 115 (one of twenty-seven labeled) and axle fittings 502 for constraining springs 112 (one of twenty-four labeled). Those of skill in the art, enlightened by this disclosure, will understand the various patterns of compression chucks 114, 116, electromagnets 115, and biasing mechanisms 112, that would be appropriate for various particular applications.

Side plates 320 of the rope braking system 100 engage top panel 110 along vertically sliding seams 402 (see FIG. 4). Seam 504 between top plate 110 and first edge member 508 includes the openings 212 for the compression chucks 116. First edge member 508 is defined by seams 402, seam 504, and the outer edge of first edge member 508. Seam 506 between top plate 110 and second edge member 510 includes openings 212 (one of ten labeled) through which wire rope 106 extends past resilient wedge members 11 and 113 below. Holes 212 are formed by aligning and joining semi-cavities 520 in top center plate 505 with semi-cavities 522 in edge member 510. Holes on the opposing side of central plate 505 are similarly formed using edge member 508. Bottom plate 108 has a complimentary construction.

Figure 6:
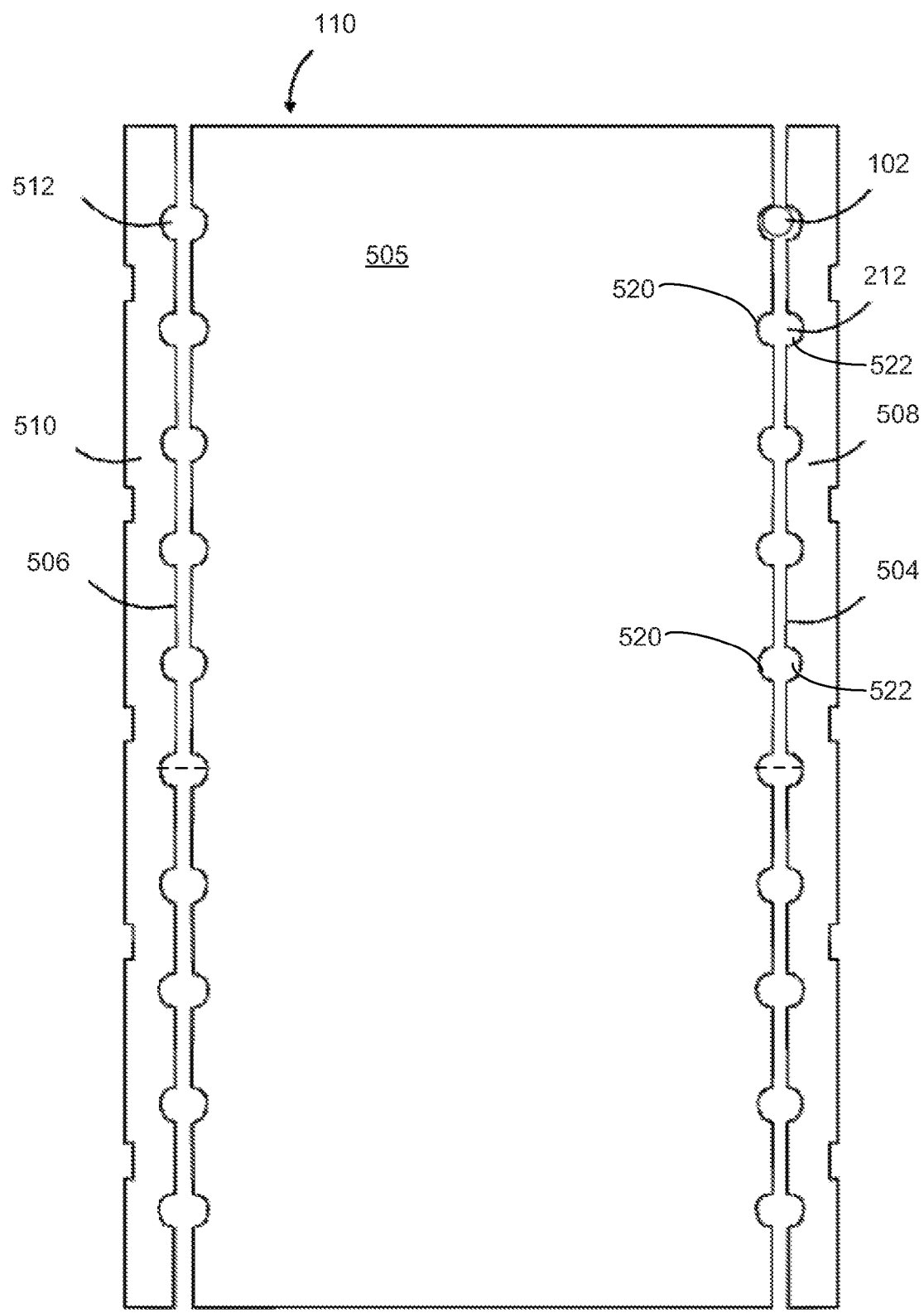
FIG. 6 is a top plan view illustrating an exemplary top plate of the exemplary rope braking system of FIG. 1A, in accordance with a preferred embodiment of the present invention.

FIG. 6 is a top plan view illustrating an exemplary top plate blank of the exemplary rope braking system 100 of FIG. 1A, in accordance with a preferred embodiment of the present invention. Top plate 110 is divided into three sections in this embodiment, center 505, and edge members 508 and 510. In some embodiments top plate 110 can be a single piece. In other embodiments top plate 110 can be divided into more or less than three pieces. Seam 504 between center 505 and first edge member 508 includes openings 212 (one of ten labeled) for compression chuck bases 102 (one of ten shown) of compression chucks 116. Seam 506 between center 505 and second edge member 510 includes holes 512 (one of ten labeled) through which wire rope 106 extends, and which, on its underside, holds resilient wedge members 111 and 113 of compression chucks 114. Bottom plate 108 has a complimentary construction, although it holds anchors 117 instead of electromagnets 115.

It should be understood that in an alternate embodiment compression chuck base 102 can be formed as an integral part of top plate 110 or bottom plate 108. Compression chuck base 102 may be formed as part of center 505 and first edge member 508 surrounding openings 212 (see FIG. 2A), for example, in top plate 110. This makes assembly of wire rope braking system 100 easier, as compression chuck bases 102 do not need to be inserted into openings 212 or around rope 106. When rope 106 passes through openings 212 it will automatically be encircled by compression chuck bases 102, which will be integral to center piece 505 and first edge member 508 of top plate 110.

The construction of plate 110 from three separate pieces can be seen in FIG. 5, as well as the formation of holes 212 from semi-cavities. Before edge members 508 and 510 are installed, strands of rope 106 are aligned in semi-cavities 520 and captured by formation of openings 212 by alignment and fastening of semi-cavities 522 in edge members 508 and 510. Preferably, where assembly of resilient wedge members 111 and 113 is desired, one resilient wedge member 111 is coupled to an edge member 508, 510 proximate the opening 212 and an opposing resilient wedge member 113 is coupled to center plate 505 proximate the opening 212.

Figure 7A:
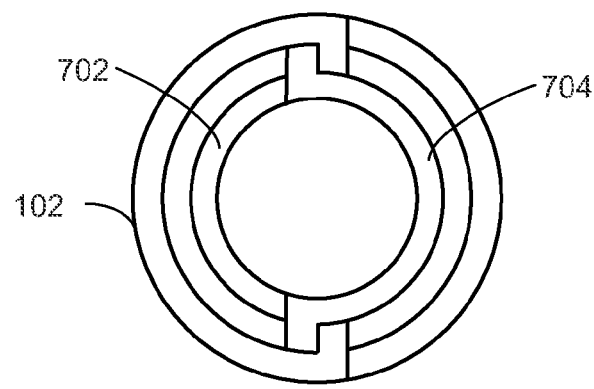
FIG. 7A is a top plan view illustrating an exemplary assembled base for the exemplary compression chuck of the exemplary rope braking system of FIG. 1A, in accordance with a preferred embodiment of the present invention.

FIG. 7A is a top plan view illustrating an exemplary assembled base 102 for the exemplary compression chucks 114 and 116 of the exemplary wire rope braking system 100 of FIG. 3, in accordance with a preferred embodiment of the present invention. The two halves 702 and 704 slidingly interlock to form compression chuck base 102. Compression chucks 114 and 116 are assembled around the rope 106 during installation of the rope braking system 100 on crane block 302.

Figure 7B:
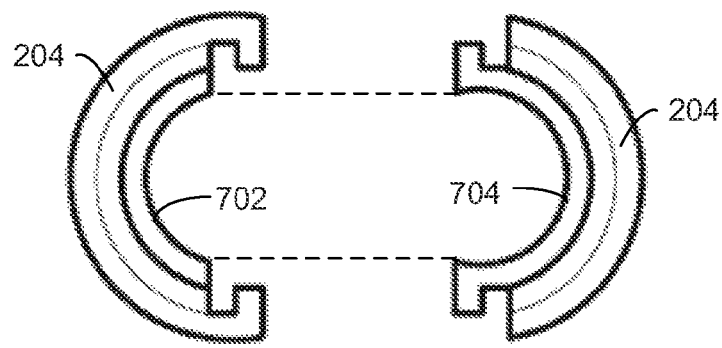
FIG. 7B is a top plan view illustrating an exemplary unassembled base of the exemplary compression chuck of the exemplary rope braking system of FIG. 1A, in accordance with a preferred embodiment of the present invention.

FIG. 7B is a top plan view illustrating an exemplary unassembled base 102 for the exemplary compression chuck 114, 116 of the exemplary wire rope braking system 100 of FIG. 3, in accordance with a preferred embodiment of the present invention. The two halves 702 and 704 are shown separately. The split configuration allows compression chuck base 102 to be coupled around rope 106. This allows the wire rope braking system 100 to be quickly assembled. If compression chuck base 102 is a unitary piece, rope 106 would need to be threaded through each compression chuck base 102 for assembly, which complicates assembly and takes more time. Compression chuck base 102 is made in two pieces, as shown, which simplifies construction of rope braking system 100 significantly, especially for field assembly and maintenance of crane head 302. As mentioned above, one embodiment of rope braking system 100 has compression chuck base 102 formed integral to either top plate 110 or bottom plate 108, or both. In this case compression chuck base 102 can be formed as a unitary piece or multiple pieces according to the construction of top plate 110 or bottom plate 108.

Figure 7C:
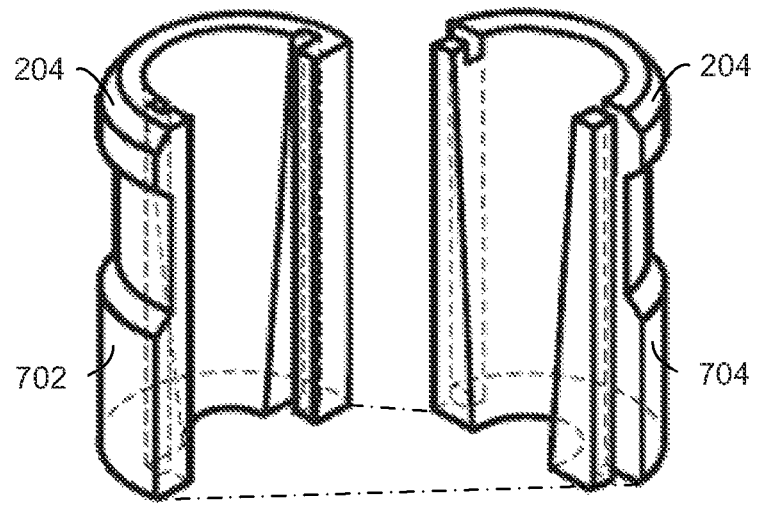
FIG. 7C is a perspective view showing the exemplary unassembled base of the exemplary compression chuck of the exemplary rope braking system of FIG. 1A, in accordance with a preferred embodiment of the present invention.

FIG. 7C is a perspective view illustrating an exemplary unassembled base 102 of the exemplary compression chuck 114, 116 of the exemplary wire rope braking system 100 of FIG. 3, in accordance with a preferred embodiment of the present invention. Each half 702 and 704 of base 102 has a shape complimentary to the other. In an alternate embodiment, the base 102 may be made of a unitary machined or molded piece. However, two-part construction is preferred as it avoids having to thread rope 106 during assembly of wire rope braking system 100 on crane head 302. Shoulder 204 on compression chuck base 102 allows base 102 to be held securely in position by plates 110 and 108. The use of compression chuck bases 102 allows thinner plates 110 and 108 to be used, reducing the weight of rope braking system 100. In assembly, plate 110 is aligned in position with strands of wire rope 106 in sheaves 404; sides 702 and 704 of each compression chuck base 102 are slidingly joined over wire rope 106 and are nested in respective semi-cavities 520 on the edge of center 505; and then edge member 508 is positioned with aligned semi-cavities 522 to secure the compression chuck bases 102 into position. A similar process is used to assemble plate 108, which is normally assembled before plate 110.

Figure 8:
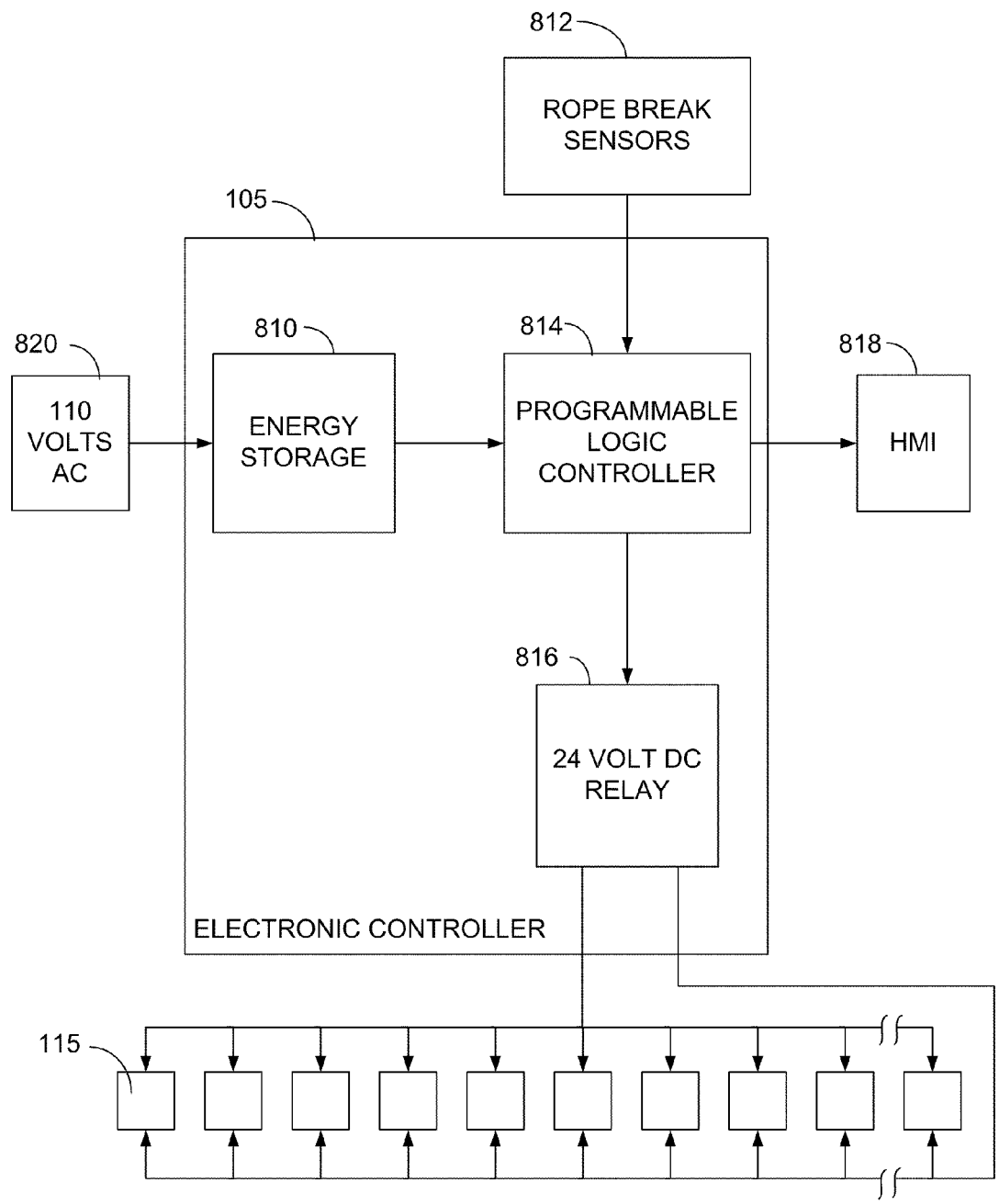
FIG. 8 is a diagrammatic view illustrating an exemplary embodiment of an electronic controller for the exemplary rope braking system of FIG. 1A, in accordance with a preferred embodiment of the present invention.

FIG. 8 shows electronic controller 105 connected to an exemplary electromagnets 115 (three of twenty-seven labeled) of electromagnetic actuator system 119 of rope braking system 100, in accordance with a preferred embodiment of the present invention. Electronic controller 105 can take various forms. Electronic controller 105 as used in rope braking system 100 of FIG. 3 includes energy storage (e.g., batteries and charger) 810, rope brake sensors 812, programmable logic controller 814, and 24 volt DC relay 816. In the present embodiment, electronic controller 105 is connected to power source 820, which is shown as 110 volt AC, and Human/Machine Interface ("HMI") 818 which allows human control of the system such as for setting and receiving alarms and resetting rope braking system 100 after a rope 106 break 940 (see FIG. 9). Rope break sensors 812 sense a rope break 940. Rope break sensors 812 can take many different forms. In some embodiments rope break sensor 812 is a rope tension limit switch. In some embodiments rope break sensors 812 sense the vibration and shock which occurs from a rope break 940. Programmable logic controller 814 maintains electromagnets 115 in a non-energized state until it receives an indication from a rope break sensor 812 that a rope break 940 has occurred, at which time it energizes electromagnets 115. In the present embodiment, energizing electromagnets 115 is accomplished by connecting them to 24 volts DC power using relays 816. Connecting electromagnets 115 to 24 volts DC power places electromagnetic actuator system 119 in an energized state, which urges plate 110 and plate 108 together, engaging compression chucks 114 and 116 with rope 106. Electronic controller 105 energizes electromagnets 115 in response to a rope break 940. Electronic controller 105 can include various components, and can be configured to energize electromagnets 115 in various ways. Programmable logic controller 814 can be replaced with relays used for control and indication. Electromagnets 115 may be energized from the crane power supply 820 by a power conduit reeled down and up with the crane head 302. In an alternate embodiment, emergency power may be supplied from an electrical energy storage device 810 coupled to wire rope braking system 100 and normally kept charged by the power conduit from the crane power supply 820. For example, ultra capacitors may serve as light-weight energy storage for energizing electromagnets 115 of the wire rope braking system 100. Even if an accident that breaks wire rope 106 also breaks the power conduit, wire rope braking system 100 will still operate.

HMI 818 is preferably a remote control and preferably includes a panic button for causing emergency stoppage of the rope 106. Controller 105 preferably includes a built-in-test function that can be run and analyzed from a remote HMI 818. Various power sources 820 may be used in various embodiments, including wind and solar power systems.

Electromagnets 115 are energized automatically in response to a broken wire rope 106, as sensed by any sensor 812. For example, an acoustic sensor may be used to detect the higher frequencies resulting from faster motion of wire rope 106 when it runs free after breaking. For further example, speed detectors on sheaves 404 may be used. Those of skill in the art of sensors, enlightened by this disclosure, will be aware of the wide variety of options for sensing a broken wire rope 106 and subsequently energizing electromagnets 115 of electromagnetic actuator system 119.

Rope braking system 100 as disclosed provides an automatic rope brake safety system which prevents load loss and boom failure by monitoring the condition of rope 106 and braking the movement of rope 106 in the event of rope breakage 940 or separation. Upon breakage of rope 106, sensors 812 detect the breakage of rope 106 and send an indication of rope breakage to programmable logic controller 814. Programmable logic controller 814 activates electromagnetic actuator system 119 in response to this indication of rope breakage 940. Activating electromagnetic actuator system 119 places electromagnets 115 in an energized state. Accordingly, electronic controller 105 places electromagnets 115 in an energized state in response to a break in rope 106.

Placing electromagnets 115 in an energized state causes electromagnets 115 to be forcefully drawn to anchors 117, overbearing the biasing of springs 112, causing plate 108 and plate 110 to move towards each other forcefully. Moving plate 110 and plate 108 together places compression chucks 114 and 116 in an engaged condition with rope 106, braking the movement of rope 106. Braking the movement of rope 106 allows rope 106 to contain the load, stopping the load from being dropped and causing damage. Braking the rope 106 and stopping payload from being dropped prevents serious injury and possible loss of life, prevents boom failure, prevents damage to the load, vessel, or work site, eliminates or minimizes the cost of cleanup and recovery after a rope break 940, and reduces lost revenue due to downtime from a rope break 940. Many other advantages are possible from braking the movement of a broken rope 106 and constraining the load. Rope braking system 100 can be adapted to single-sheave or multi-sheave applications, and for use with various types of rope in various industries.

FIG. 9A illustrates another exemplary embodiment of an exemplary rope braking system 900, in accordance with a preferred embodiment of the present invention. In the embodiment shown in FIG. 9A, compression chucks 114*a* and 116*a* are used instead of compression chucks 114 and 116. Limit switches 812 (two of ten labeled) are supported proximate rope 106 by support plate 935. Support plate 935, coupled at least to bottom plate 908, also supports controller 105 (not shown here). When rope 106 breaks 940, the brake 940 is sensed by limit switch 812, which communicates with controller 105, resulting in activation of the electromagnets 115 and braking of the rope 106.

Note that embodiment 900 has thirty electromagnets 115 and thirty-two biasing mechanisms 112. Side plates 320 fixedly couple bottom plate 908 and slidingly couple upper plate 910. Bottom plate 908 has a stepped end 920 that is received in groove 922. A step 915 on each end of upper plate 910 engages overhang 916 of side plate 320 to limit upward vertical motion of upper plate 910. Routing for wires (not shown) from the controller 105 to the electromagnets 115 are preferably on the top of plate 910, and a further cover (not shown) over a portion of center plate 505 may be used to protect the wiring from the environment.

Figure 9B:
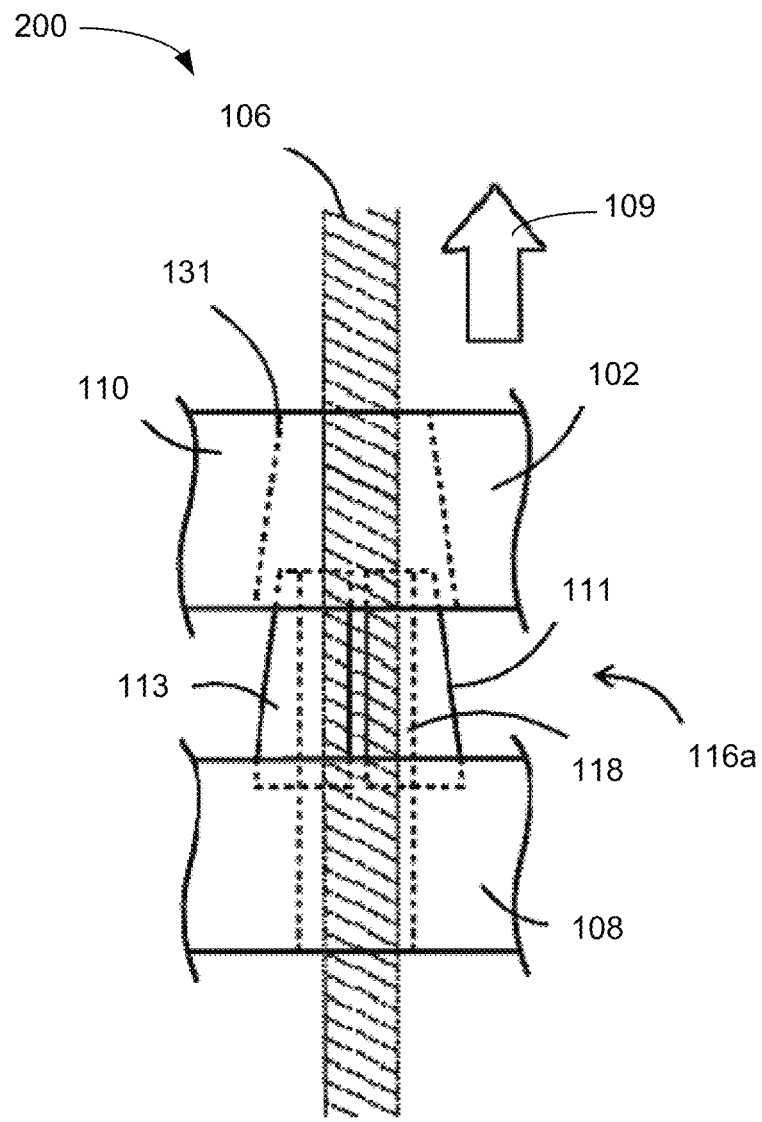
FIG. 9B is a cross section side elevation view illustrating a second exemplary compression chuck used in the exemplary rope braking system of FIG. 9A, in accordance with a preferred embodiment of the present invention.

FIG. 9B shows a cross-section side view illustrating the exemplary up-rope compression chuck 116a, in which compression chuck base 102 is integrated with plate 108, in accordance with a preferred embodiment 200 of the present invention. In down-rope compression chuck 114a (See FIG. 1B), base 102 is integral with bottom plate 108. In up-rope compression chuck 116a, base 102 is integral with top plate 110. Forming compression chuck base 102 as an integral part of either top plate 110 or bottom plate 108 reduces the parts count and makes assembly easier. Compression chuck base 102 will no longer have to be fitted in position in bottom plate 108 or top plate 110. Rope 106 can be run through the openings in bottom plate 108 or top plate 110, which openings will, in the present embodiment 200, contain compression chuck base 102 functionality, which requires separate pieces in other embodiments.

Figure 9C:
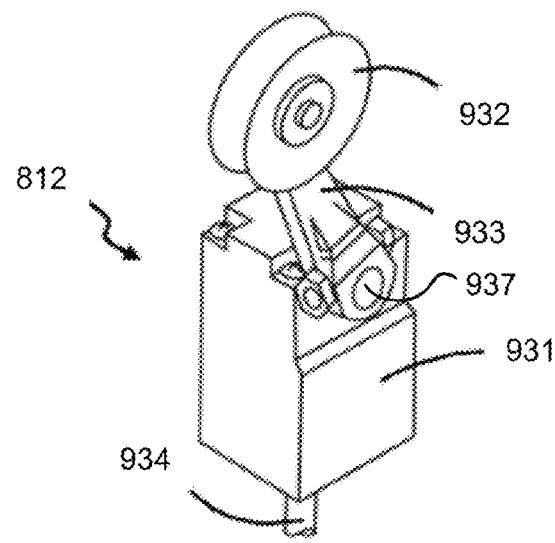
FIG. 9C is a perspective view illustrating an exemplary limit switch used in the exemplary rope braking system of FIG. 9A, in accordance with a preferred embodiment of the present invention.

FIG. 9C is a perspective view illustrating an exemplary limit switch 812 used as a rope break sensor 812 in the exemplary rope braking system 900 of FIG. 9A, in accordance with a preferred embodiment of the present invention. Limit switch 812 includes body 931, roller 932, arm 933, arm pivot 927, and wires 934. An electrical switch is contained within the body 931 and is operated by arm 933 rotating arm pivot 937. Limit switch 812 is merely exemplary, and various types of rope break sensors 812 may be used in various embodiments.

Figure 9D:
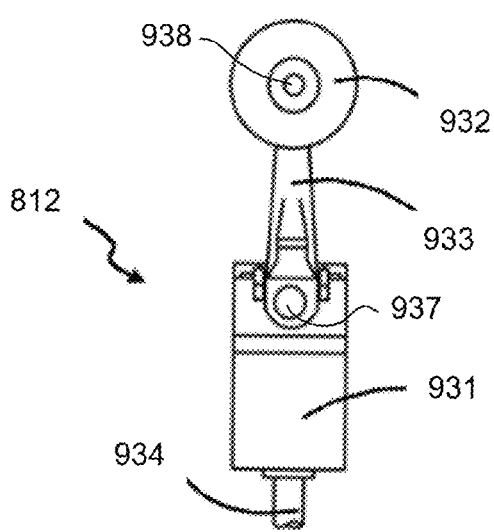
FIG. 9D is a front elevation view illustrating the exemplary illustrating limit switch used in the exemplary rope braking system of FIG. 9A, in accordance with a preferred embodiment of the present invention.

FIG. 9D is a front elevation view illustrating the exemplary limit switch 812 used in the exemplary rope braking system 900 of FIG. 9A, in accordance with a preferred embodiment of the present invention. Roller 932 rotates freely on axle 938. Arm 933 shows a range of rotational motion compared to FIG. 9C.

Figure 9E:
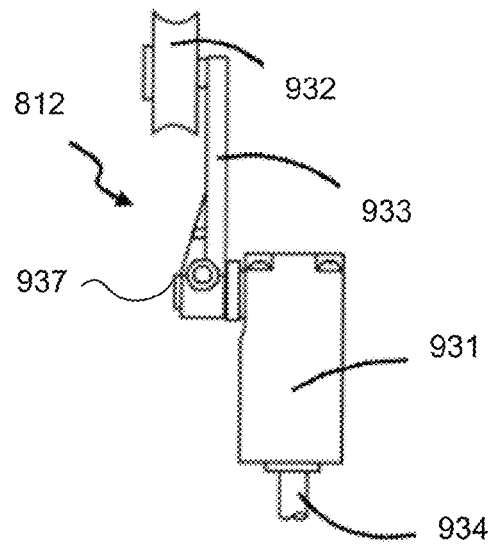
FIG. 9E is a side elevation view illustrating the exemplary limit switch used in the exemplary rope braking system of FIG. 9A, in accordance with a preferred embodiment of the present invention.

FIG. 9E is a side elevation view illustrating the exemplary limit switch 812 used in the exemplary rope braking system 900 of FIG. 9A, in accordance with a preferred embodiment of the present invention. Body 931 has adaptations (not shown) for coupling to support panel 935.

Figure 9F:
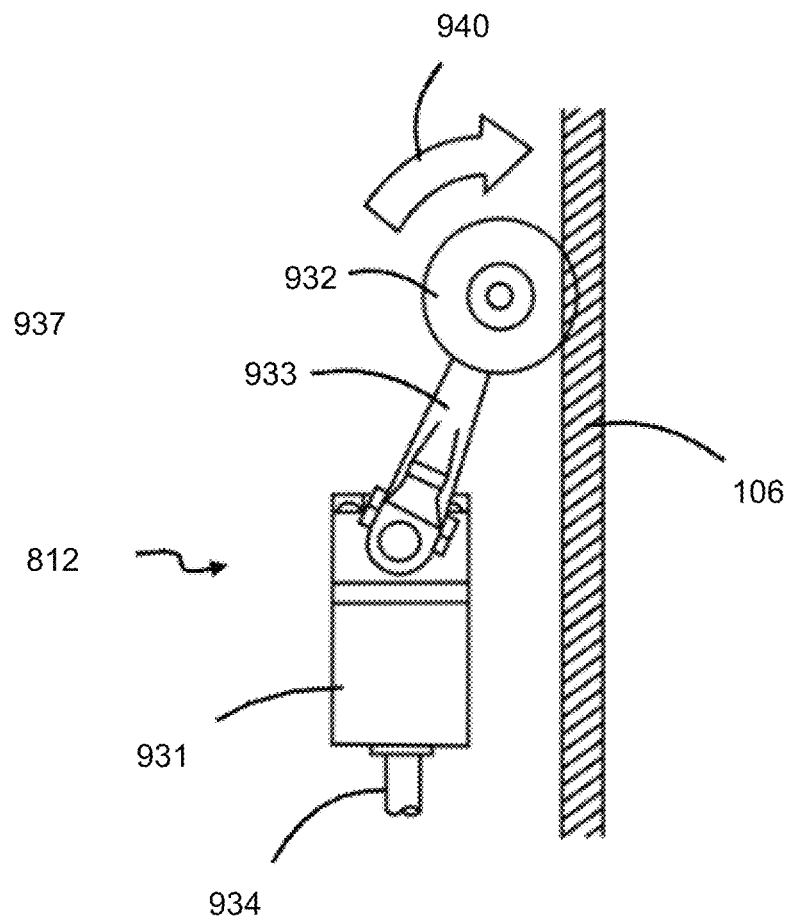
FIG. 9F is a side elevation view illustrating the exemplary limit switch used in the exemplary rope braking system of FIG. 9A in an exemplary actuated position, with an exemplary roller against an exemplary rope, in accordance with a preferred embodiment of the present invention.

FIG. 9F is a side elevation view illustrating the exemplary limit switch 812 used in the exemplary rope braking system 900 of FIG. 9A in an exemplary actuated position with an exemplary roller 932 against an exemplary rope 106, in accordance with a preferred embodiment of the present invention. Limit switch 812 is in an activated state—which means there is no rope breakage 940. In an activated state, limit switch 812 senses the tension on rope 106 with roller 932, which is placed against rope 106 and held against rope 106 by pressure 940 exerted by arm 933 and roller 932. Roller 932 rolls freely as rope 106 moves up or down, reducing friction caused by contact with the rope 106. The pressure of rope 106 on roller 932 keeps limit switch 930 in an activated state. When rope 106 breaks 940, roller 932 and arm 933 will move to the rope break state in response to tension on rope 106 being released. Limit switch 812 sends a rope break signal to programmable logic controller 814 in response to tension in rope 106 being lost due to rope break 940. Limit switch 812 sends this signal to programmable logic controller 814 via wires 934. When rope 106 is in an unbroken state, limit switch 812 remains in an activated—no rope brake—condition.

Figure 10:
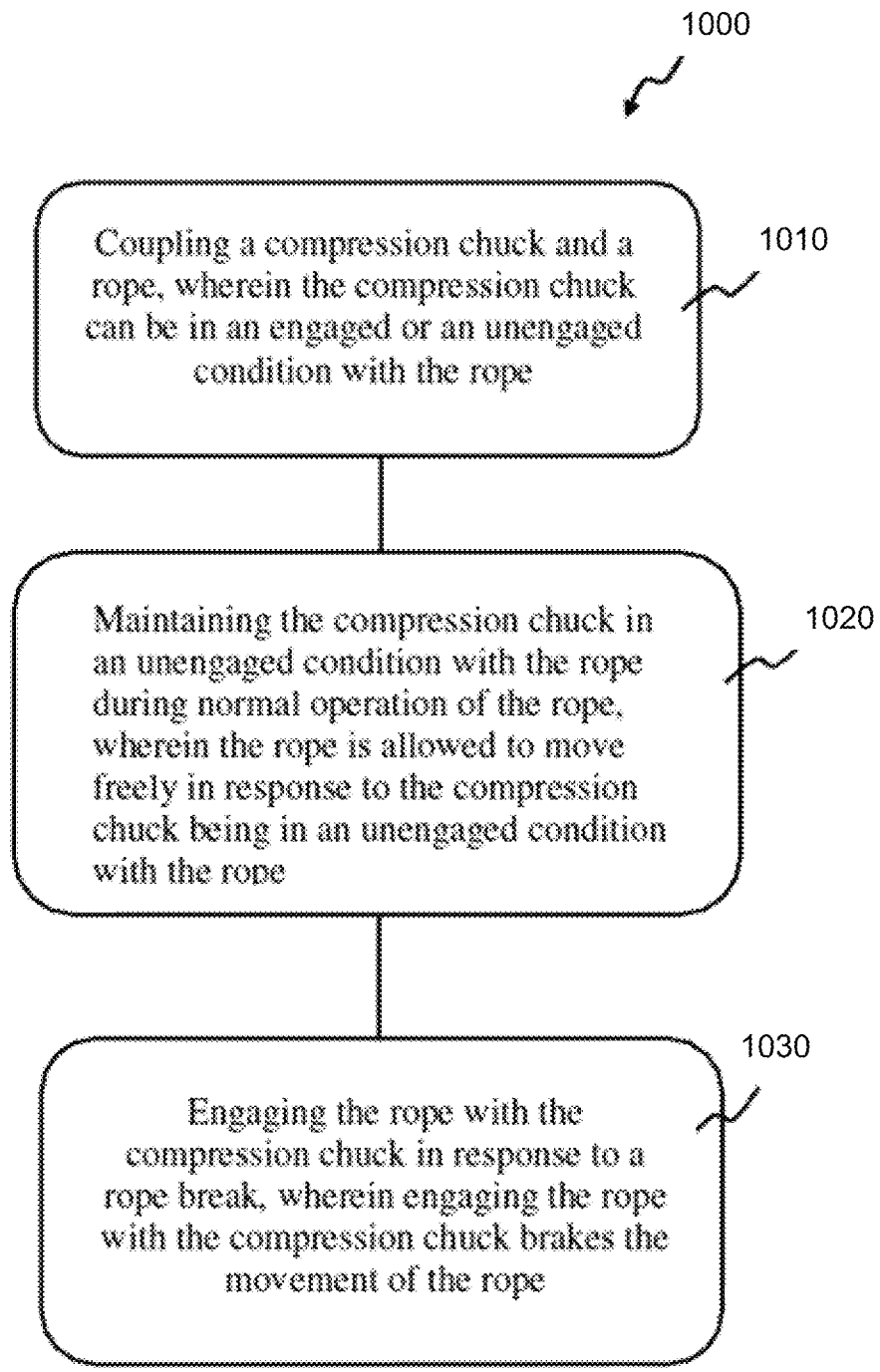
FIG. 10 is a process flow chart illustrating an exemplary method of braking a rope, in accordance with a preferred embodiment of the present invention.

FIG. 10 is a process flow chart illustrating an exemplary method of using rope braking system 100, 900, in accordance with a preferred embodiment of the present invention. Step 1010 includes coupling a compression chuck 114 and a rope 106. In some embodiments, coupling a compression chuck 114 and a rope 106 includes assembling a compression chuck 114 around a rope 106, wherein the compression chuck 114 includes a base 102 and resilient wedge portions 111, 113. In some embodiments, the base 102 can be comprised of multiple pieces. In some embodiments, the resilient wedge members 111 and 113 can be comprised of multiple pieces. In a preferred embodiment, the base 102 may be integral with the plates 908 or 910.

Step 1020 includes maintaining the compression chuck 114 in a disengaged condition with the rope 106 during normal operation of the rope 106. In some embodiments, step 1020 includes mechanically holding the compression chuck 114 in a disengaged condition with the rope 106 during normal operation of the rope 106. Step 1020 can include mounting the compression chuck base 102 into a first plate 108, 110, mounting the resilient wedge members 111 and 113 into a second plate 110, 108, and holding the first and the second plate in a spaced relationship with a spring 112, wherein the spring 112 maintains the compression chuck 114 in the disengaged condition with the rope 106 during normal operation of the rope 106.

Step 1030 includes engaging the rope with the compression chuck 114, 116, 114a, 116a, in response to a rope break 940. In some embodiments step 1030 includes electromagnetically placing the compression chuck 114, 116, 114a, 116a in an engaged condition with the rope 106 in response to a rope break 940. In some embodiments, step 1030 includes mounting an electromagnet 115 in the second plate and mounting an anchor 117 in the first plate wherein the electromagnet 115 and the anchor 117 move towards each other in response to the electromagnet 115 being energized, maintaining the electromagnet 115 in a non-energized state during normal operation of the rope, and placing the electromagnet 115 and the anchor 117 in an energized state in response to a rope break 940.

Figure 11:
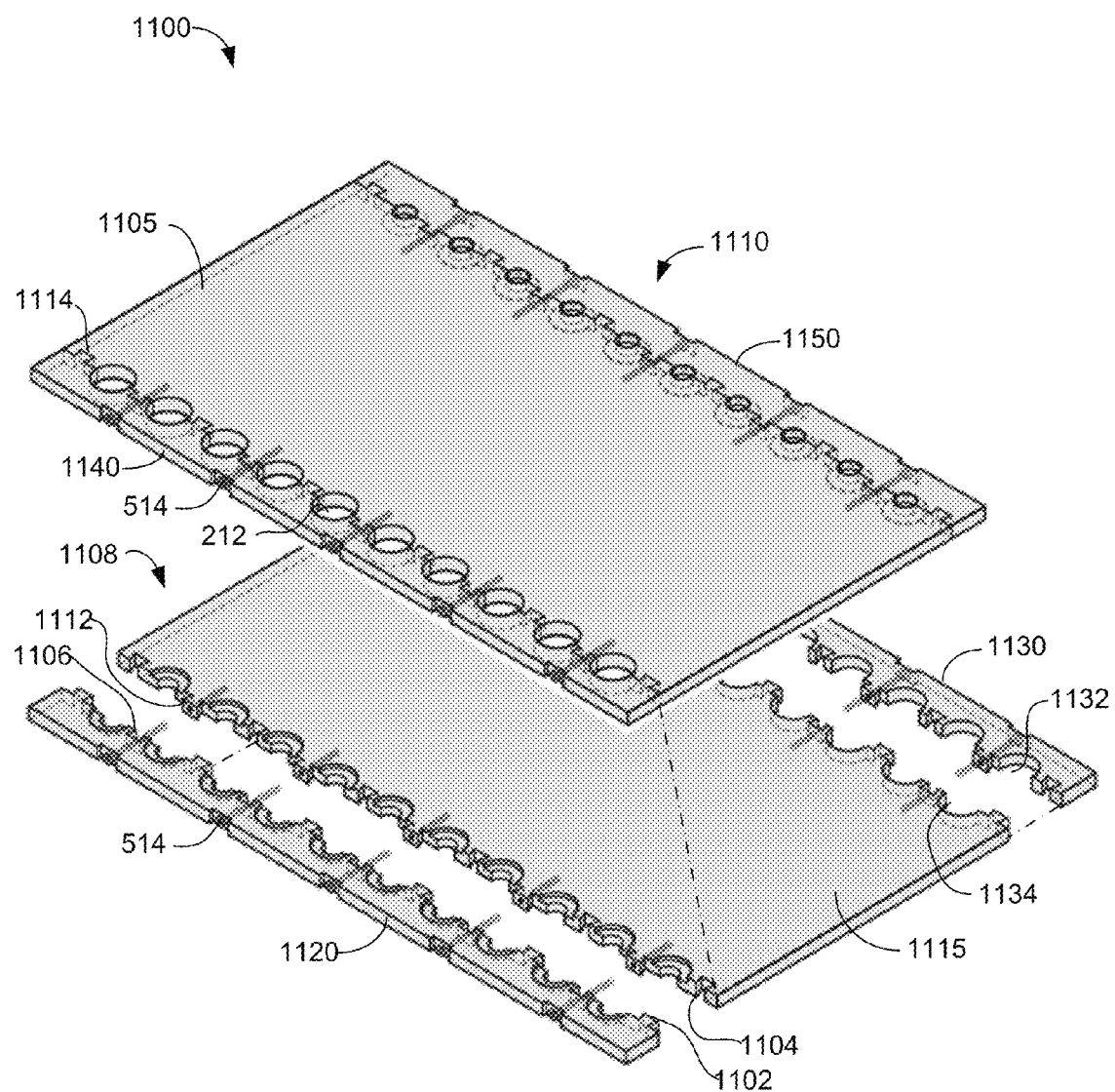
FIG. 11 is a perspective view of an alternate embodiment of exemplary plates of an exemplary embodiment of a rope braking system, according to a preferred embodiment of the present invention.

FIG. 11 is a perspective view of an exemplary alternate embodiment of exemplary blank plates 1108, 1110 of an exemplary embodiment of a rope braking system 1100, according to a preferred embodiment of the present invention. First and second edge members 1140 and 1150 connect to central plate 1105 using both dove tail joints 1114 (one of twenty-two labeled) and screws 514 (one of ten labeled) to form upper plate 1110. The dove-tail joint 1114 configuration is preferred for the alternate embodiments 200, 900 in which bases 102 are omitted in favor of tapered holes 131 in the plates 1108, 1110. Third and fourth edge members 1120 and 1130 connect to central plate 1115 using both dove tail joints 1114 (one of sixteen visible labeled) and screws 514 (one of seven visible labeled) to form lower plate 1108. Dovetail joints are formed of dovetail notches 1104 and complimentary interlocking dovetail protrusions 1102. Preferably, the dovetail notches 1104 and the dovetail protrusions 1102 alternate along the length of central panels 1105 and 1115, and in complimentary fashion along the meeting edges of first through fourth edge members 1120, 1130, 1140, and 1150. Dovetail protrusions 1112 in central panels 1105 and 1115 have threaded bores for receiving screws 514, while dovetail notches have through bores 1106 for receiving screws 514.

During exemplary installation on a crane head 302, rigged with rope 106, and with side plates 320 installed, the central panels 1105, 1115 are placed between the rope 106 strands such that the strands are fitted into the semi-cavities 1134 (one labeled of thirty-five visible) along the edge. The edge members 1120, 1130, 1140, and 1150 are then installed, capturing the strands as semi-cavities 1132 (one labeled of thirty-five visible) form openings 212 by aligning with and joining semi-cavities 1134. In embodiment 100, capturing the strands of rope 106 with bases 102 and fitting bases 102 into the semi-cavities would precede coupling edge members 1120, 1130, 1140, and 1150 to central panels 1105 and 1115.

Figure 12:
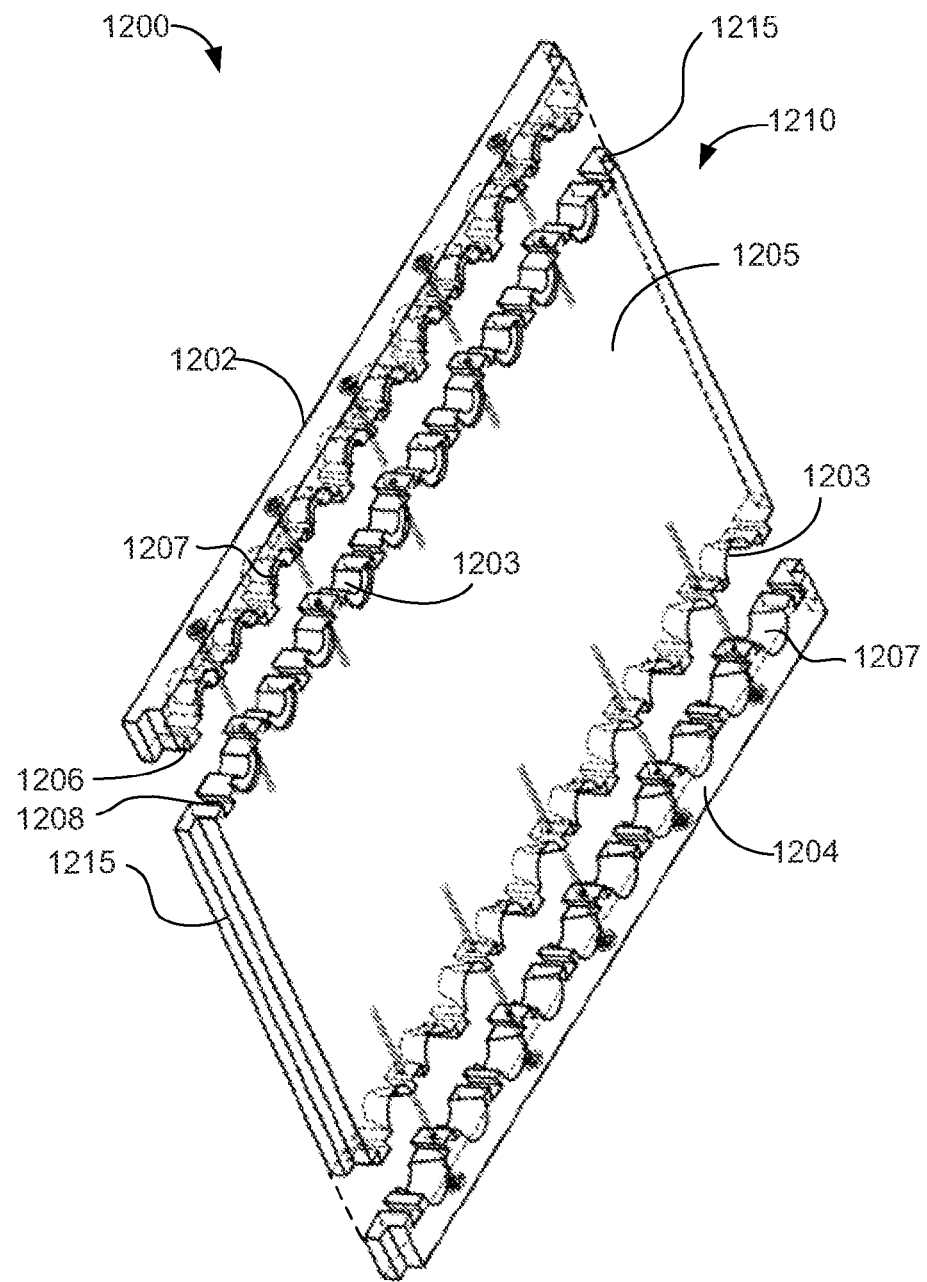
FIG. 12 is a second perspective view of the alternate embodiment of exemplary plates of the exemplary embodiment of a rope braking system of FIG. 11, according to a preferred embodiment of the present invention.

FIG. 12 is a perspective view of another alternate embodiment of an exemplary top blank plate 1210 of an exemplary embodiment 1200 of a rope braking system 100, 900, and 1100, according to a preferred embodiment of the present invention. Top plate 1210 includes central plate 1205 and edge members 1202 and 1204. Edge members 1202 and 1204 have semi-cavities 1203 (two of twenty labeled) that align with semi-cavities 1207 (two of twenty labeled) in edge members 1202 and 1204. Top plate 1210 combines the stepped ends 1215 of embodiment 900 of FIG. 9A and the dovetail joints 1206, 1208 of embodiment 1100.

Figure 13:
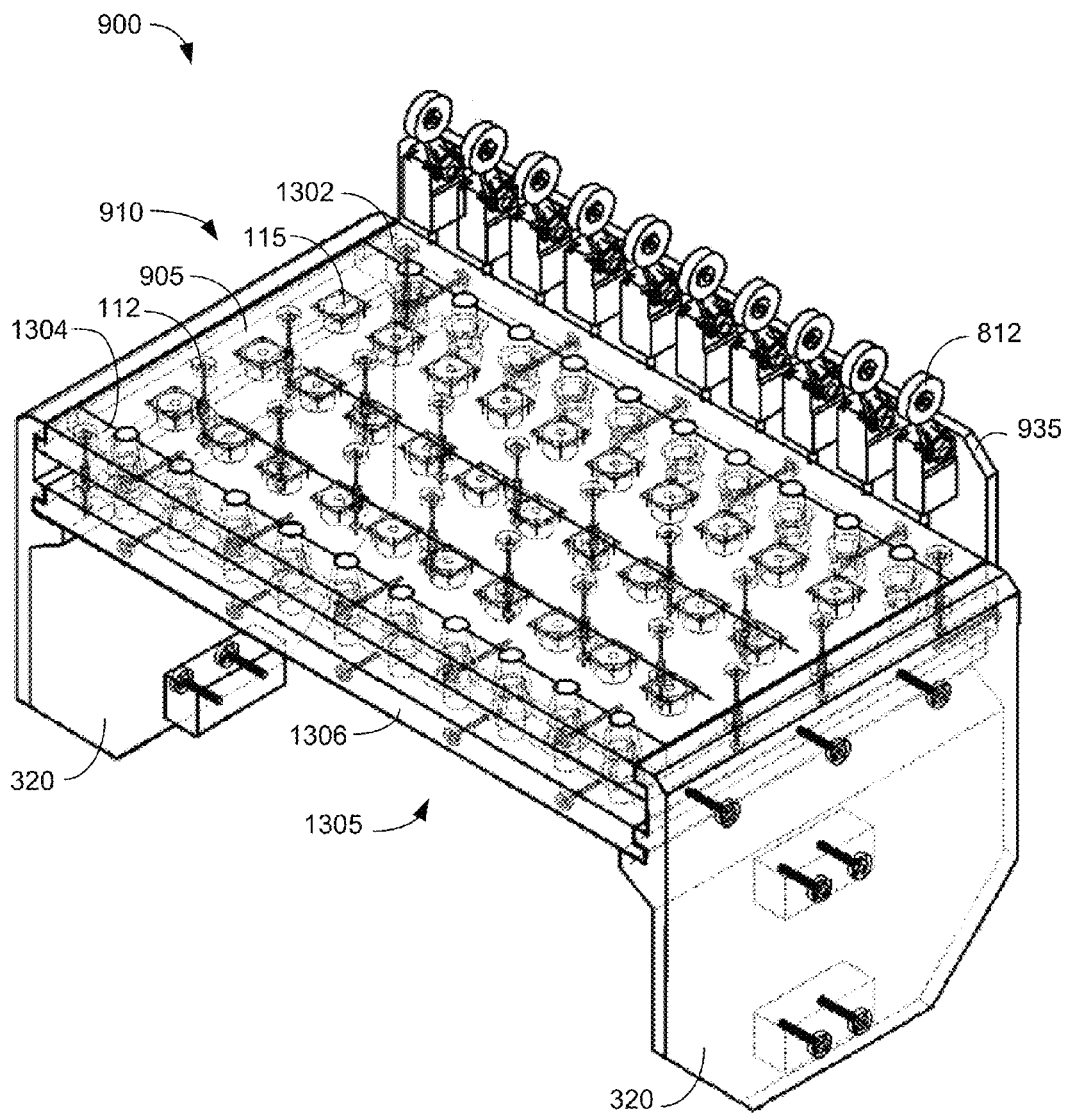
FIG. 13 is a top-front perspective view illustrating the exemplary additional embodiment of the exemplary crane head with the exemplary rope braking system of FIG. 9A, according to a preferred embodiment of the present invention.

FIG. 13 is a top-front perspective view illustrating the exemplary additional embodiment of the exemplary rope braking system 900 of FIG. 9A, according to a preferred embodiment of the present invention. FIG. 13 illustrates the exemplary rope braking system 900 as it may be shipped for after-market installation, or shipped from a manufacturer to be added to a crane head 302. Controller 105 (not shown) is coupled to the rear side of support plate 935. Wiring (not shown) for the electromagnets and control circuitry (not shown) is over a portion of the top of center plate 905 and is either weather-proof wiring or is covered by an additional cover (not shown).

In an alternate embodiment, the exemplary rope braking system 900 may be shipped with side plates 320 detached. Those of skill in the art, enlightened by the present disclosure, will appreciate that side plates 320 may be adapted to particular models and sizes of crane heads 302, within the constraints that the bottom plate 908 must be rigidly attached to the crane head 302 and top plate 910 must be limited in its upward travel. In an alternate embodiment, side plates 320 may be adapted to coupling the bottom plate to the crane 2100 itself, as will be discussed further below.

In another alternate embodiment, the top center plate 905 and bottom center plate 1305 (not visible, but see FIG. 11 and FIG. 12), along with biasing mechanisms 112, electromagnetic actuator systems 119, and compression chucks 114a and 116a may be shipped as a unit, with edge members 1302, 1304, 1306, and rear bottom edge member (not shown) detached, and with support plate 935 and accompanying rope break sensors 812 and controller 105 (not visible) also detached. The wiring harnesses (not shown) for the rope break sensors 812 and the electromagnets 115 each end in single plugs for connection to the controller 105. The side plates 320 may, in such alternate embodiment, be shipped with the top center plate 905 and bottom center plate 1305. In an alternate embodiment, the side plates 320 may be shipped separately.

Figure 14:
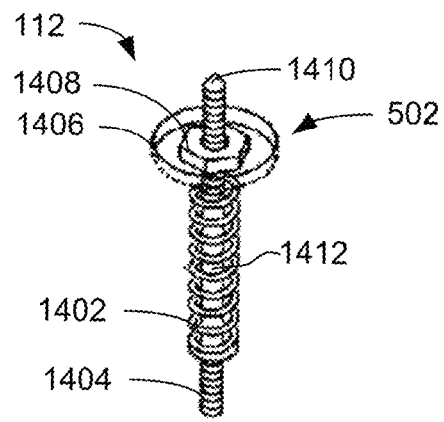
FIG. 14 is a top-front perspective view illustrating an exemplary biasing mechanism of the exemplary rope braking system of FIGS. 1A, 3-5, 9A, and 13, according to a preferred embodiment of the present invention.

FIG. 14 is a top-front perspective view illustrating an exemplary biasing mechanism 112 of the exemplary rope braking systems 100, 900, 1100, and 1200, of FIGS. 1A, 3-5, 9A, 11, 12, and 13, according to preferred embodiments of the present invention. Exemplary biasing mechanism 112 includes an axle 1412 having a threaded bottom end 1404 that may be threaded into a threaded bore in the bottom plate 108, 908, 1108, or 1308 and a threaded top end 1410 that protrudes above top plate 110, 910, 1110, or 1310. Spring 1402 winds around axle 1412 and axle 1412 constrains the motion of spring 1402 to vertical motion. Spring 1402 acts between top plate 110, 910, 1110, or 1310 and bottom plate 108, 908, 1108, or 1308 to bias top plate 110, 910, 1110, or 1310 in a spaced-apart relationship to bottom plate 108, 908, 1108, or 1308. Spring tension is established and adjusted using nut 1408 with washer 1406, which together comprise axle fittings 502.

Figure 15:
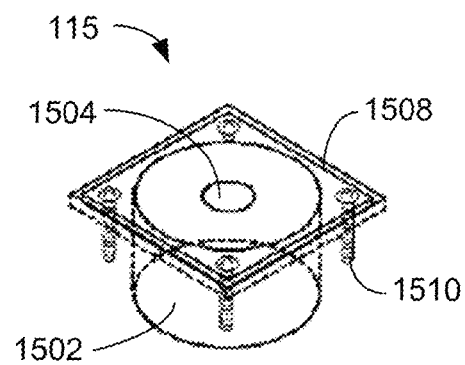
FIG. 15 is a top-front perspective view illustrating an exemplary electromagnet of the exemplary rope braking system of FIGS. 1A, 3-5, 9A, and 13, according to a preferred embodiment of the present invention.

FIG. 15 is a top-front perspective view illustrating an exemplary electromagnet 115 of the exemplary rope braking systems 100, 900, 1100, and 1200, of FIGS. 1A, 3-5, 9A, 11, 12, and 13, according to a preferred embodiment of the present invention. Exemplary electromagnet 115 has a housing 1502 containing electromagnet coil windings about magnetically permeable core 1504. Housing 1502 is fixed to support plate 1508 which receives four screws 1510 (one of four labeled) for fastening electromagnet to top plate 110, 910, 1110, or 1310 when housing 1502 is at least partially received in complimentary-sized bores in the top plate 110, 910, 1110, or 1310.

Figure 16:
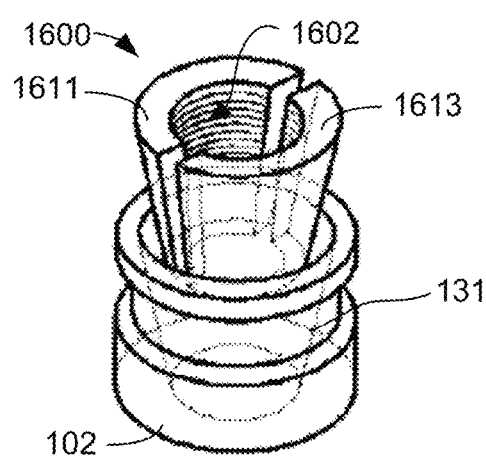
FIG. 16 is a top-front perspective view illustrating an exemplary compression chuck of the exemplary rope braking system of FIGS. 1A, 2A-C, 3-5, 9A, and 13 in a first orientation, according to a preferred embodiment of the present invention.

FIG. 16 is a top-front wire frame perspective view illustrating an exemplary compression chuck 1600 of the exemplary rope braking system 100 of FIGS. 1A, 2A-2C, 3-5, and 7 in a first orientation, according to a preferred embodiment of the present invention. Base 102 has tapered bore 131, which must be sufficiently narrow to compress resilient wedge members 1611 and 1613 when resilient wedge members 1611 and 1613 are forced into tapered bore 131. Resilient wedge members 1611 and 1613 differ from resilient wedge members 111 and 113 by the ridged rope-engaging surface 1602 (compare 129 and 130 in FIGS. 1A and 1B). The ridged rope-engaging surface 1602 increases friction between the rope 106 and the resilient wedge members 1611 and 1613 and also assists in maintaining the rope in a stopped configuration.

Figure 17:
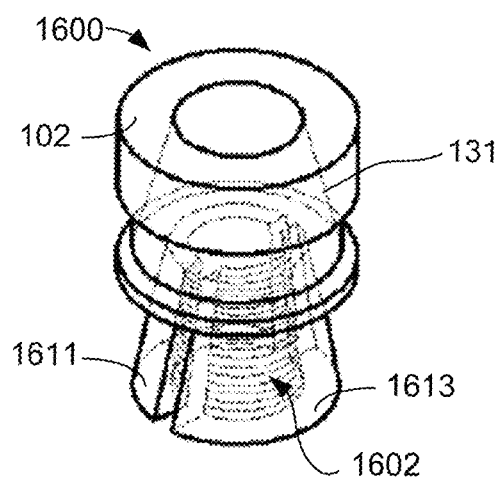
FIG. 17 is a top-front perspective view illustrating an exemplary compression chuck of the exemplary rope braking system of FIGS. 1A, 2A-C, 3-5, 9A, and 13 in a second orientation, according to a preferred embodiment of the present invention.

FIG. 17 is a top-front perspective view illustrating an exemplary compression chuck of the exemplary rope braking system 100 of FIGS. 1A, 2A-2C, 3-5, and 7 in a second orientation, according to a preferred embodiment of the present invention. It should be appreciated that the compression chucks 114a and 116a may also use ridged rope-engaging surface 1602.

Figure 18:
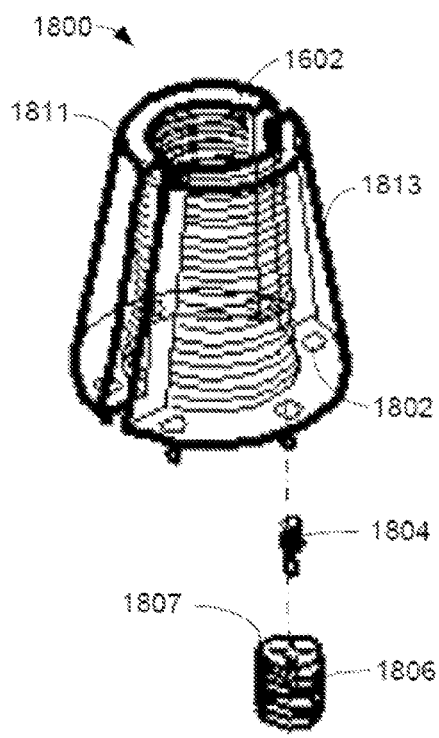
FIG. 18 is a bottom-rear exploded perspective view illustrating exemplary resilient wedge members usable with the exemplary rope braking system of FIGS. 1A, 2A-C, 3-5, 9A, and 13 in a first orientation, according to a preferred embodiment of the present invention.

FIG. 18 is a bottom-rear exploded perspective view illustrating exemplary resilient wedge members 1811 and 1813 usable with the exemplary rope braking systems 100, 900, 1100, 1200, and 1300 of FIGS. 1A, 2A-C, 3-5, 9A, and 13 in a first orientation, according to a preferred embodiment of the present invention. In the embodiment 1800, the resilient wedge members 1811 and 1813 are made to break away from the plate to which they are attached after being driven into tapered bore 131 to engage rope 106, in order to assist in recovery. Resilient wedge members 1811 and 1813 have threaded bores 1802 (one of six labeled) into which breakaway pins 1804 are threaded. The plate 108 or 110 to which the resilient wedge members 1811 and 1813 will be attached have an alignable pattern of threaded bores for receiving plastic pin receiver 1806. Plastic pin receiver 1806 has a Phillips head screw top with a central cavity 1807 for receiving a nipple of breakaway pin 1804. In compression between the plate and the resilient wedge member 1813, for example, when the compression chuck is actuated, the nipple will break off the pin 1804, severing the connection after the wedges are driven into the tapered bore 131. In tension between the plate and the resilient wedge member 1813, for example, after the rope 106 has been stopped, the broken pin 1804 enables separation of the plates 110, 108 for resetting the system.

Figure 19:
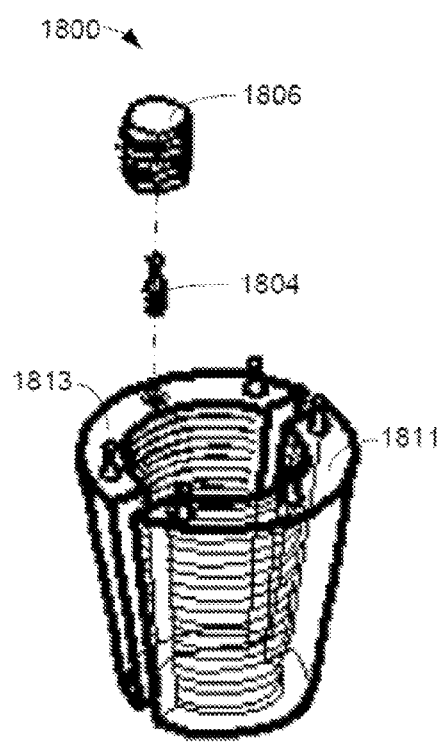
FIG. 19 is a top-front exploded perspective view illustrating exemplary resilient wedge members usable with the exemplary rope braking system of FIGS. 1A, 2A-C, 3-5, 9A, and 13 in a first orientation, according to a preferred embodiment of the present invention.

FIG. 19 is a top-front exploded perspective view illustrating exemplary resilient wedge members 1911 and 1913 usable with the exemplary rope braking systems 100, 900, 1100, 1200, and 1300 of FIGS. 1A, 2A-C, 3-5, 9A, and 13, in a second orientation, according to a preferred embodiment of the present invention. After the pins 1805 are installed on the resilient wedge members 1911 and 1913, the resilient wedge members 1911 and 1913 can be pressed into the complimentary number and arrangement of pin receivers 1806 that have been screwed into complimentary bores in plates 108 and 110.

Figure 20:
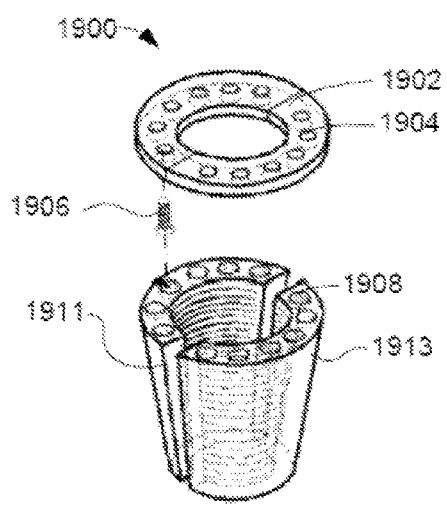
FIG. 20 is a top-front exploded perspective view illustrating exemplary resilient wedge members usable with the exemplary rope braking system of FIGS. 1A, 2A-C, 3-5, 9A, and 13, according to a preferred embodiment of the present invention.

FIG. 20 is a top-front exploded perspective view illustrating exemplary resilient wedge members 1911 and 1913 usable with the exemplary rope braking systems 100, 900, 1100, 1200, and 1300 of FIGS. 1A, 2A-C, 3-5, 9A, and 13, according to a preferred embodiment of the present invention. Resilient wedge members 1911 and 1913 have magnetic discs 1908 (one of twelve labeled) installed along the surface that meets with the plate. A non-magnetic annulus 1902 has a series of holes 1904 (one of twelve labeled) alignable to the magnetic discs 1908. Magnetic screws 1906 (one of twelve shown) are threaded into the holes 1904 and into the plate, oriented to attract magnetic discs 1908. During normal operations, the magnets 1908, 1906 retain the resilient wedge members 1911 and 1913. After a rope break 940, the plates 110, 108 can be separated for recovery.

Figure 21:
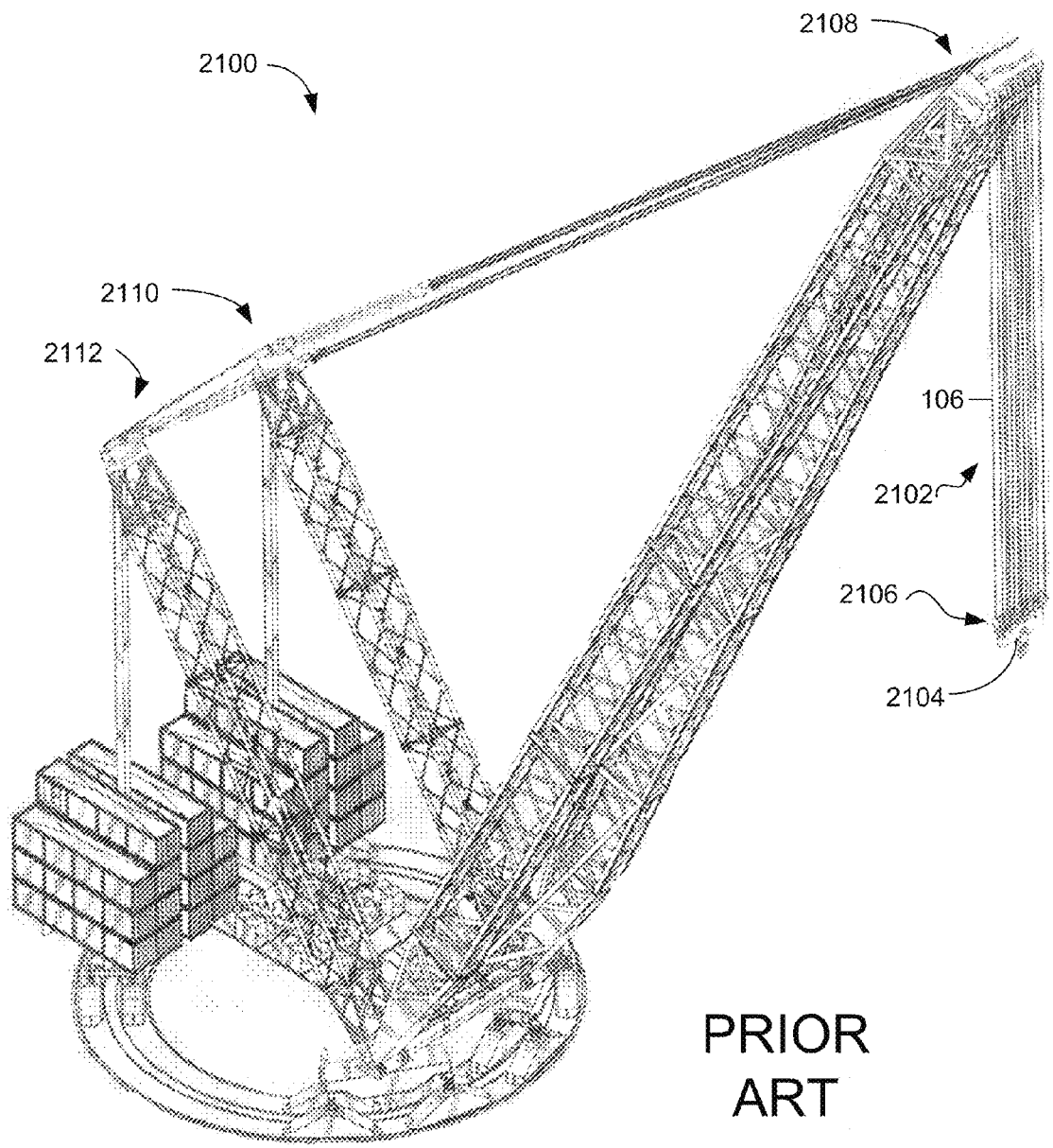
FIG. 21 is a top-front perspective view illustrating an exemplary prior-art crane usable with the exemplary rope braking systems, according to preferred embodiments of the present invention.

FIG. 21 is a top-front perspective view illustrating an exemplary prior-art crane 2100 usable with the exemplary rope braking systems 100, 900, 1100, 1200, and 1300, according to preferred embodiments of the present invention. U.S. Design D606,725 presents an example of a big crane 2100, of the sort usable with the present invention. FIG. 1 of that design patent is provided as an illustration here in FIG. 21. Strands 2102 of rope 106 couple crane head 2104 to crane 2100 and engage crane head 2104, as with crane head 302. The present invention may be located on top of the crane head 2104, at position 2106. Alternatively or additionally, the present invention may be located at position 2108, or 2110 and 2112, coupled to the crane 2100 structure, rather than the crane head 2104. There are many designs of cranes 2100, and the present invention may be adapted to each. Those of skill in the art, enlightened by the present disclosure, will appreciate that any structure proximate a running rope 106 may support an embodiment, whether illustrated or not, of the present invention.

Figure 22:
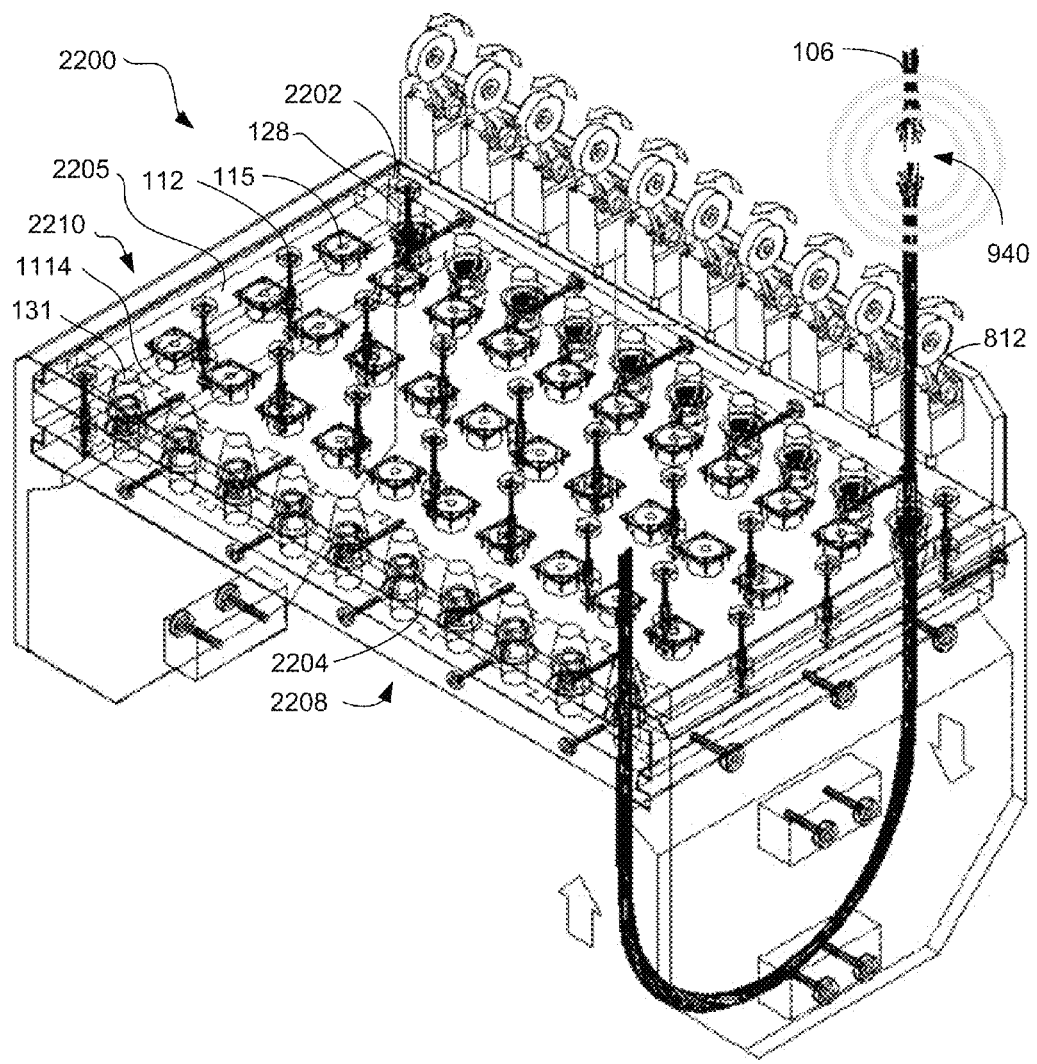
FIG. 22 is a top-front perspective view illustrating another additional embodiment of the exemplary rope braking system, in accordance with a preferred embodiment of the present invention.

FIG. 22 is a top-front perspective view illustrating another additional embodiment of the exemplary rope braking system 2200, in accordance with a preferred embodiment of the present invention. Rope braking system 2200 has dovetail joints 1114 joining side pieces 2202 and 2204 to center panel 2205 to form top panel 2210 with integral tapered bores 131 and openings 128 for receiving rope 106. Bottom panel 2208 is of similar construction.

Figure 23:
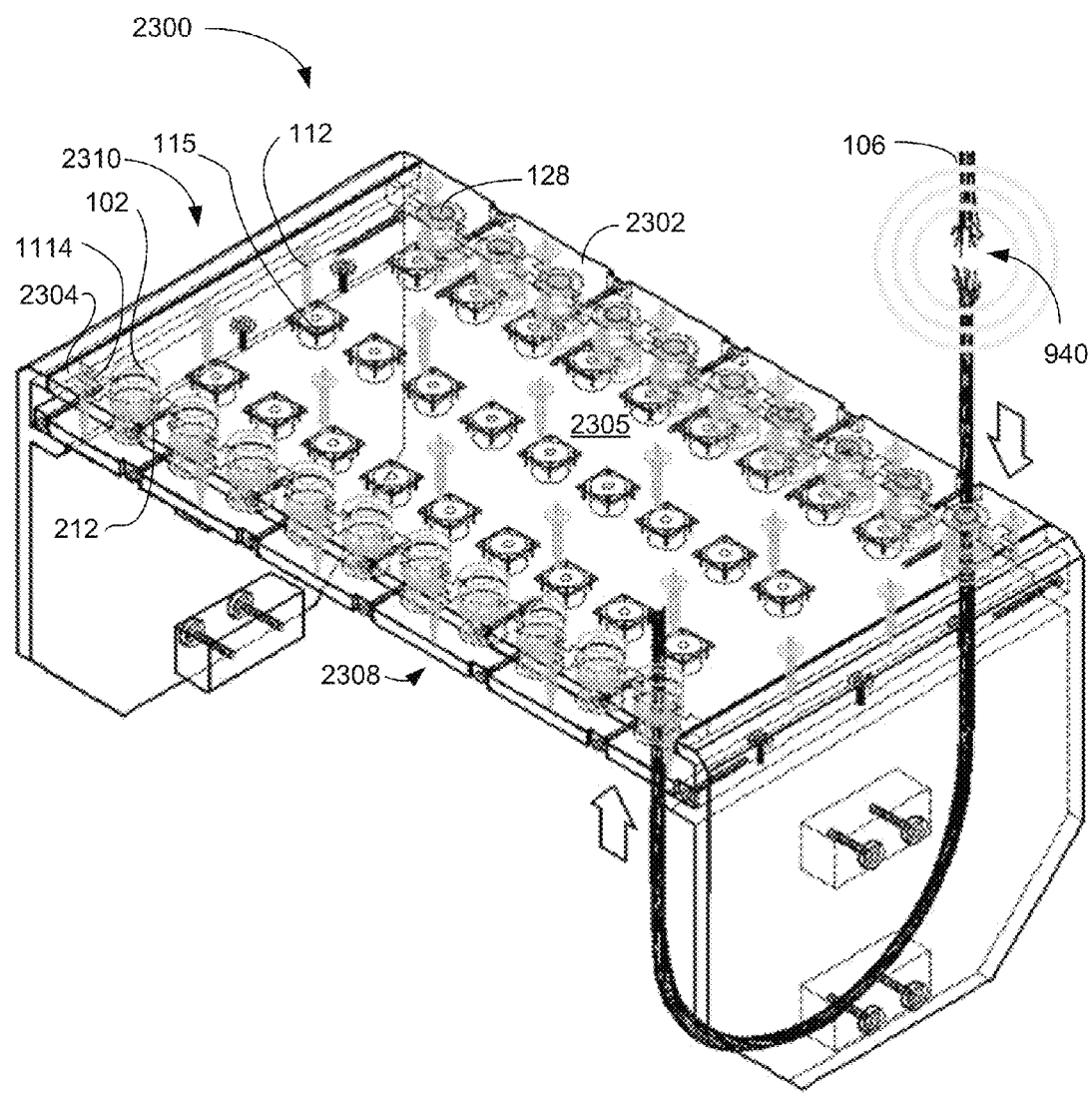
FIG. 23 is a top-front perspective view illustrating yet another additional embodiment of the exemplary rope braking system, in accordance with a preferred embodiment of the present invention.

FIG. 23 is a top-front perspective view illustrating yet another additional embodiment of the exemplary rope braking system 2300, in accordance with a preferred embodiment of the present invention. Rope braking system 2300 has dovetail joints 1114 joining side pieces 2302 and 2304 to center panel 2305 to form top panel 2310 with openings 212 for receiving bases 102 and openings 128 for receiving rope 106. Bottom panel 2308 is of similar construction.

Figure 24:
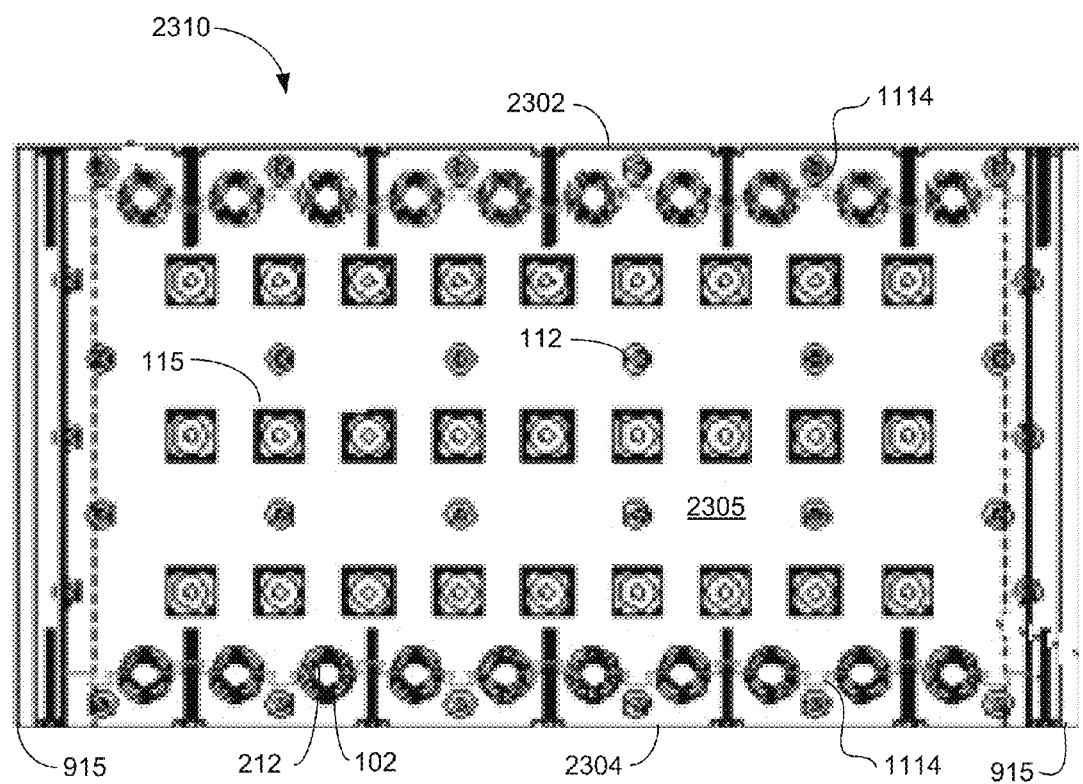
FIG. 24 is a top plan view illustrating an exemplary top plate of the exemplary rope braking system, in accordance with the preferred embodiment of FIG. 23 of the present invention.

FIG. 24 is a top plan view illustrating an exemplary top plate 2310 of the exemplary rope braking system 2300, in accordance with the preferred embodiment of FIG. 23 of the present invention. Dovetail joints 1114 join side pieces 2302 and 2304 to center panel 2305 to form top panel 2310 with openings 212 for receiving bases 102 and openings 128 for receiving rope 106.

Figure 25:
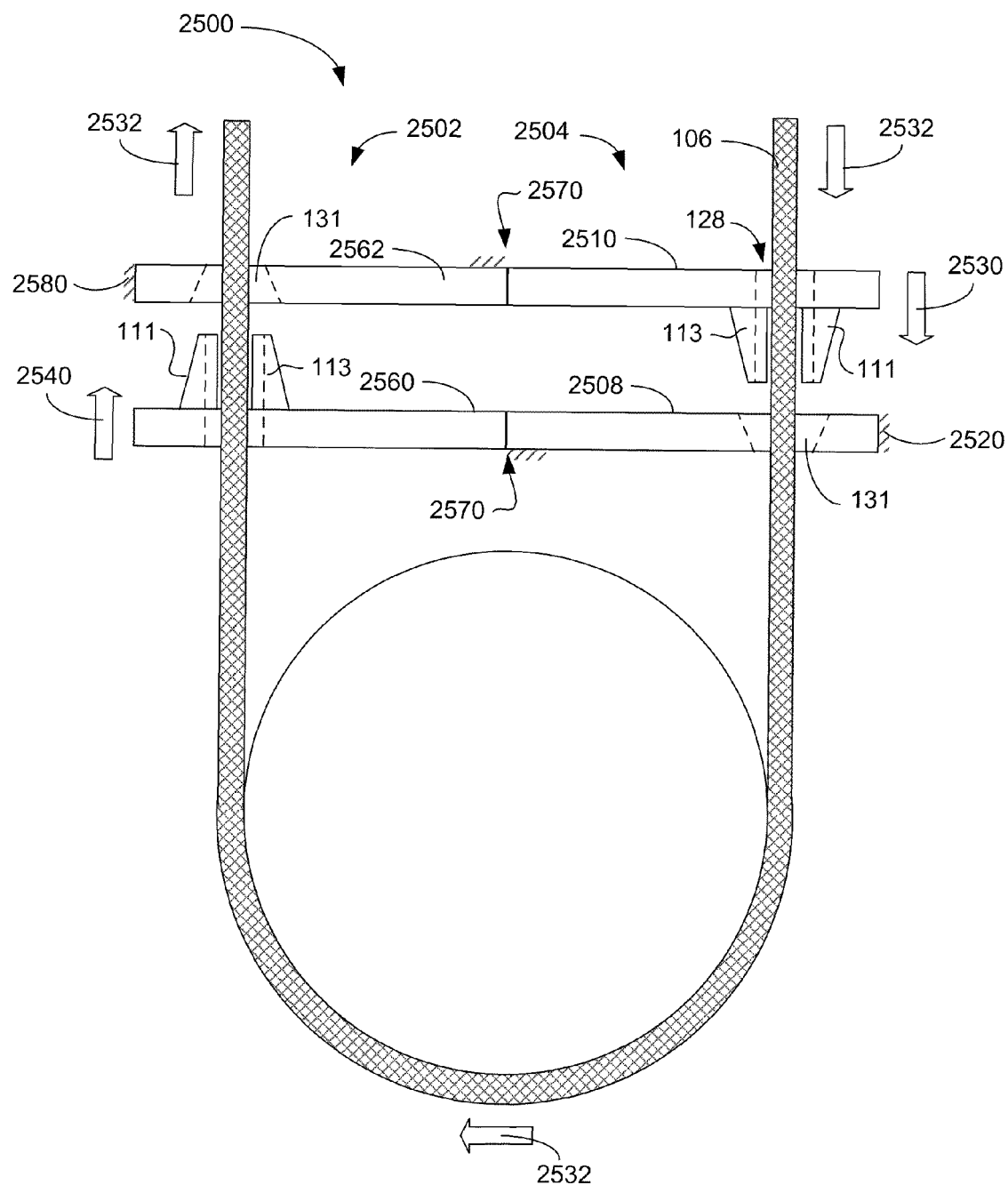
FIG. 25 is a diagrammatic end view illustrating an exemplary split-plate embodiment of the exemplary rope braking system, in accordance with a preferred embodiment of the present invention.

FIG. 25 is a diagrammatic end view illustrating an exemplary split-plate embodiment of the exemplary rope braking system 2500, in accordance with a preferred embodiment of the present invention. The direction 2532 of rope 106 travel shown is the direction that the rope 106 will play out in the event of breakage. Care must be exercised to properly determine direction 2532 before installation of any of the embodiments of the present invention. Moveable 2530 top right-side-plate 2510 is biased in a spaced apart relationship from fixed 2520 bottom-right-side plate 2508 by biasing mechanisms 112 (not shown) and may be urged toward bottom-right-side plate 2508 by actuators 115 (not shown). Moveable 2540 bottom left-side-plate 2560 is biased in a spaced apart relationship from fixed 2580 top-left-side plate 2562 by biasing mechanisms 112 (not shown) and may be urged toward top-left-side plate 2562 by actuators 115 (not shown). Seams 2570 between right side assembly 2504 and left side assembly 2502 allow the moveable 2530, 2540, half-plates 2510, 2560, respectively, to move vertically. Using the right side as an example, as moveable 2530 top-right-side plate 2510 moves toward fixed 2520 bottom-right-side plate 2508, the resilient wedge members 111 and 113 move into tapered bore 131, which forces resilient wedge members 111 and 113 together to frictionally engage, compress, and brake rope 106. The friction between resilient wedge members 111 and 113 and rope 106 urges the resilient wedge members 111 and 113 more forcefully into the tapered bore 131. The left side assembly 2502 operates in a similar fashion. In the present embodiment, the friction between the rope 106 and the resilient wedge members 111 and 113 tends to close the compression chuck 200 on both sides, whereas in previous embodiments, such friction would tend to close the compression chucks 200 on the side where the rope 106 comes into the rope braking system 100 but would not tend to close the compression chucks 200 on the side where the rope 106 exits the rope braking system 100.

It will be obvious to those of skill in the art, enlightened by the present disclosure, that many variations, all within the scope of the present invention, may be possible. For example, the method and apparatus may be readily adapted to strand material that is not wire rope 106. For further example, block and tackle systems of various kinds, not limited to use with cranes, could benefit from this method and apparatus. Likewise, crane heads 302 with various numbers of sheaves other than ten could benefit from the present invention. The above exemplary embodiments are offered as illustrations and not as limitations.

The invention claimed is:
1. A rope braking system comprising:
 a first plate;
 a second plate parallel to and spaced apart from said first plate;
 at least one first portion of a compression chuck coupled to said first plate;
 at least one biasing mechanism operable to maintain said second plate spaced-apart from said first plate in a first configuration;
 at least one actuator coupled to at least said second plate and operable to overbear said biasing mechanism to urge said second plate towards said first plate in a second configuration;
 at least one second portion of said compression chuck coupled to said second plate and aligned to said at least one first portion of said compression chuck;
 wherein said at least one first portion of a compression chuck and said at least one second portion of a compression chuck comprises one of:

a tapered bore surrounding a first opening in one of said first plate and said second plate; and at least first and second resilient wedge members opposed across a second opening in one of said second plate and said first plate, respectively; and wherein said second portion of said compression chuck comprises a base portion having said tapered bore.

2. The rope braking system of claim 1, comprising first and second side plates operable to at least one of:
couple said first plate to a crane head;
couple said first plate to a crane;
couple said first plate to a structure; and
constrain movement of said second plate.

3. The rope braking system of claim 1, comprising at least one rope-break sensor, operable to:
detect a break in such rope; and
signal a controller concurrent with said rope break detection.

4. The rope braking system of claim 1, comprising a controller operable to:
receive a signal from at least one rope-break sensor indicating that such rope has broken; and
respond to said received signal by energizing said at least one actuator.

5. The rope braking system of claim 1, comprising a crane head, wherein said crane head is operable to be fixed to at least one of said first plate and said second plate.

6. The rope braking system of claim 1, comprising a crane coupled to at least one of:
a crane head coupled to said first plate; and
said first plate.

7. The rope braking system of claim 1, comprising:
at least one semi-cavity along at least one edge of at least one of said first plate and said second plate; and
at least one edge member comprising at least one semi-cavity complementary to, and alignable to, said at least one semi-cavity along said at least one edge of one of said first plate and said second plate, wherein said at least one edge member is operable to be fastened to said at least one edge of one of said first plate and said second plate to form said complimentary and alignable at least one semi-cavities into at least one opening operable to conduct such rope.

8. The rope braking system of claim 7, wherein said at least one edge member is operable to be fastened by at least one of:
at least one screw; and
at least one dovetail joint.

9. The rope braking system of claim 1, wherein said at least one actuator comprises at least one electromagnet.

10. The rope braking system of claim 1, comprising a support plate, operable to be coupled to at least said first plate, and further operable to support at least one of a rope-break sensor and a controller.

11. A rope braking system comprising:
a first plate;
a second plate parallel to and spaced apart from said first plate;
at least one first portion of a compression chuck coupled to said first plate;
at least one biasing mechanism operable to maintain said second plate spaced-apart from said first plate in a first configuration;
at least one electromagnetic actuator coupled to at least said second plate and operable to overbear said biasing mechanism to urge said second plate towards said first plate in a second configuration; and at least one second portion of said compression chuck coupled to said second plate and aligned to said at least one first portion of said compression chuck coupled to said first plate;
wherein said at least one first portion of a compression chuck and said at least one second portion of a compression chuck comprises one of:
a tapered bore surrounding a first opening in one of said first plate and said second plate; and
at least first and second resilient wedge members opposed across a second opening in one of said second plate and said first plate, respectively;
wherein said tapered bore comprises one of:
a base portion of said compression chuck having said tapered bore; and
said tapered bore in one of said first plate and said second plate.

12. The rope braking system of claim 11, comprising:
first and second side plates operable to:
couple said first plate to a crane head;
couple said first plate to a crane; and
couple said first plate to a structure; and
at least one rope-break sensor, operable to:
detect a break in such rope; and
signal a controller concurrent with such rope break detection;
wherein said controller is operable to:
receive said signal from said at least one rope-break sensor indicating that such rope has broken; and
respond to said received signal by energizing said at least one electromagnetic actuator.

13. The rope braking system of claim 11, comprising a crane head, wherein said crane head is operable to:
be fixed to at least one of:
said first plate; and
said second plate; and
be coupled to a crane.

14. The rope braking system of claim 11, comprising a support plate, operable to be coupled to at least said first plate, and further operable to support at least one of a rope-break sensor and a controller.

15. The rope braking system of claim 11, comprising:
at least one semi-cavity along at least one edge of at least one of said first plate and said second plate; and
at least one edge member comprising at least one semi-cavity complementary to, and alignable to, said at least one semi-cavity along said at least one edge of one of said first plate and said second plate, wherein said at least one edge member is operable to be fastened to said at least one edge of one of said first plate and said second plate to form said complimentary and alignable at least one semi-cavities into at least one opening operable to conduct such rope; and
wherein said at least one edge member is operable to be fastened by at least one of:
at least one screw; and
at least one dovetail joint.

16. A rope braking system comprising:
a first plate;
a second plate parallel to and spaced apart from said first plate;
at least one first portion of a compression chuck coupled to said first plate;
at least one biasing mechanism operable to maintain said second plate spaced-apart from said first plate in a first configuration;

at least one electromagnetic actuator coupled to at least said second plate and operable to overbear said biasing mechanism to urge said second plate towards said first plate in a second configuration; and at least one second portion of said compression chuck coupled to said second plate and aligned to said at least one first portion of said compression chuck coupled to said first plate;

wherein said at least one first portion of a compression chuck and said at least one second portion of a compression chuck comprises one of:
- a tapered bore surrounding a first opening in one of said first plate and said second plate; and
- at least first and second resilient wedge members opposed across a second opening in one of said second plate and said first plate, respectively; and wherein said tapered bore comprises one of:
- a base portion having said tapered bore; and
- said tapered bore in one of said first plate and said second plate;

first and second side plates operable to:
- couple said first plate to a crane head;
- couple said first plate to a crane; and
- couple said first plate to a structure;

at least one rope-break sensor, operable to:
- detect a break in such rope; and
- signal a controller concurrent with such rope break detection;

wherein said controller is operable to:
- receive a signal from said at least one rope-break sensor indicating that such rope has broken; and
- respond to said received signal by energizing said at least one electromagnetic actuator;

a crane head, wherein said crane head is operable to:
- be fixed to at least one of:
  - said first plate; and
  - said second plate; and
- be coupled to a crane;

a support plate, operable to be coupled to at least said first plate, and further operable to support said at least one rope-break sensor and said controller;

at least one semi-cavity along at least one edge of at least one of said first plate and said second plate; and at least one edge member comprising at least one semi-cavity complementary to, and alignable to, said at least one semi-cavity along said at least one edge of one of said first plate and said second plate, wherein said at least one edge member is operable to be fastened to said at least one edge of one of said first plate and said second plate to form said complimentary and alignable semi-cavities into at least one opening operable to conduct such rope; and wherein said at least one edge member is operable to be fastened by at least one of:
- at least one screw; and
- at least one dovetail joint.

17. A rope-braking system for variously conducting and braking the payout of a rope, comprising:

a compression chuck, comprising first and second compression chuck portions each having a tapered bore, operable to one of conduct such rope and brake such rope;

a biasing mechanism operable to bias said first compression chuck portion in a spaced-apart disengaged relationship with said second compression chuck portion, said disengaged relationship being operable to conduct such rope;

an actuator mechanism, coupled to at least one of said first compression chuck portion and said second compression chuck portion, operable, responsive to an indication that such rope has broken, to overbear said biasing mechanism to urge said first and second compression chuck portions to an engaged relationship, said engaged relationship being operable to brake such rope.

* * * * *